US012641560B2

(12) United States Patent
Liu et al.

(10) Patent No.: US 12,641,560 B2
(45) Date of Patent: May 26, 2026

(54) DATA TRANSMISSION METHOD AND DATA TRANSMISSION APPARATUS

(71) Applicant: HUAWEI TECHNOLOGIES CO., LTD., Shenzhen (CN)

(72) Inventors: Zhe Liu, Shanghai (CN); Chenghui Peng, Shanghai (CN); Jianjun Wu, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 445 days.

(21) Appl. No.: 18/331,945

(22) Filed: Jun. 9, 2023

(65) Prior Publication Data

US 2023/0319908 A1 Oct. 5, 2023

Related U.S. Application Data

(63) Continuation of application No. PCT/CN2021/133708, filed on Nov. 26, 2021.

(30) Foreign Application Priority Data

Dec. 11, 2020 (CN) .......................... 202011445066.3

(51) Int. Cl.
*H04W 56/00* (2009.01)
*H04W 24/02* (2009.01)
(Continued)

(52) U.S. Cl.
CPC ....... *H04W 56/0045* (2013.01); *H04W 24/02* (2013.01); *H04W 76/10* (2018.02); *H04W 76/20* (2018.02)

(58) Field of Classification Search
CPC . H04W 76/10; H04W 56/0045; H04W 76/20; H04W 24/02; H04W 48/20; H04W 76/12; H04W 76/19
See application file for complete search history.

(56) References Cited

U.S. PATENT DOCUMENTS

2014/0092866 A1* 4/2014 Teyeb ............... H04W 36/0064
370/331

FOREIGN PATENT DOCUMENTS

| CN | 103906176 A | 7/2014 | |
| CN | 108495342 A | * 9/2018 | ........ H04W 36/0016 |
| WO | 2020216339 A1 | 10/2020 | |

OTHER PUBLICATIONS

Zhang, "A switching method, terminal, base station and computer readable storage medium", Sep. 4, 2018, CN, CN 201810082441, English trandlation (Year: 2018).*

* cited by examiner

*Primary Examiner* — Michael K Phillips

(57) ABSTRACT

This application provides a data transmission method and a data transmission apparatus, which can establish a radio bearer for a data plane based on a new wireless network architecture (i.e., a network architecture in which a control plane and a user plane are separated) to implement data transmission. The method includes: a terminal device sends selection information to a control plane access network device, where the selection information indicates a target user plane access network device, which is determined from at least one user plane access network device based on system information and a user plane access network device selection rule. The terminal device receives first timing advance information and first radio bearer configuration information from the control plane access network device, and performs data transmission with the target user plane access network device based on the first timing advance information and the first radio bearer configuration information.

16 Claims, 12 Drawing Sheets

(51) Int. Cl.
    *H04W 76/10*        (2018.01)
    *H04W 76/20*        (2018.01)

| Control plane | User plane | |
|---|---|---|
| RRC | SDAP | |
| PDCP | PDCP | |
| RLC | RLC | RLC |
| MAC | MAC | MAC |
| PHY | PHY | PHY |

| Control plane | User plane | |
|---|---|---|
| RRC | SDAP | |
| PDCP | PDCP | |
| RLC | RLC | |
| MAC | MAC | |
| PHY | HARQ | HARQ |

Common control channel

| MIB | SIB | SSB | Paging | RRC |
|-----|-----|-----|--------|-----|

Common control carrier

Data

Data carrier 1

Data

Data carrier 2

1300

1400

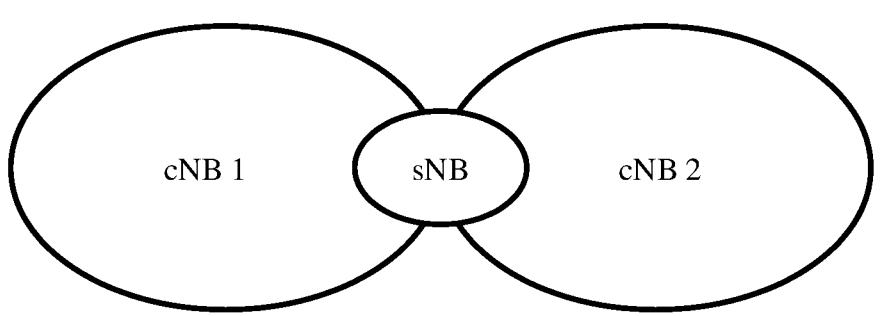
FIG. 17
| R | First TA information | |
|---|---|---|
| First TA information | | Second TA information |
| Second TA information | | |
| Uplink grant | | |
| C-RNTI | | |
| C-RNTI | | |
FIG. 18
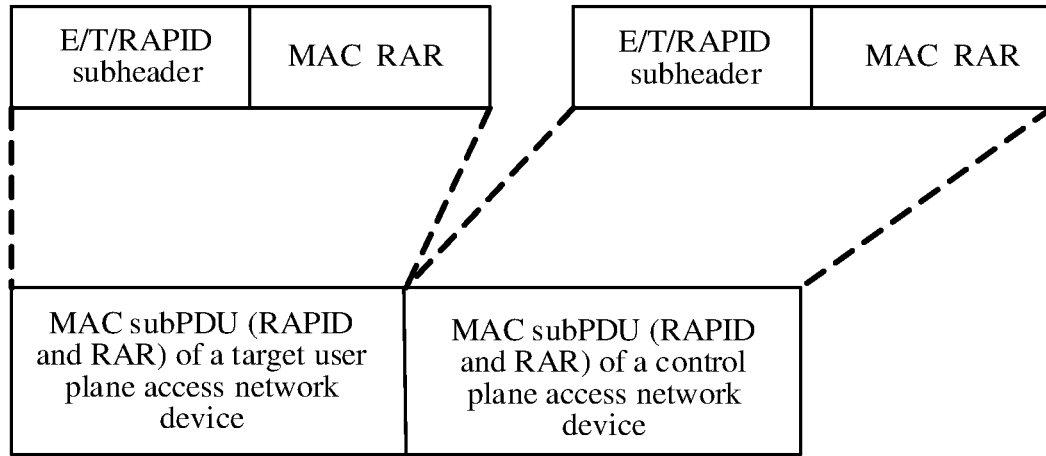
FIG. 19

DATA TRANSMISSION METHOD AND DATA TRANSMISSION APPARATUS

CROSS-REFERENCE TO RELATED APPLICATIONS

This application is a continuation of International Application No. PCT/CN2021/133708, filed on Nov. 26, 2021, which claims priority to Chinese Patent Application No. 202011445066.3, filed on Dec. 11, 2020. The disclosures of the aforementioned applications are hereby incorporated by reference in their entireties.

TECHNICAL FIELD

This application relates to the communications field, and more specifically, to a data transmission method and a data transmission apparatus.

BACKGROUND

With continuous updating of communication scenarios and communication requirements, people raise more requirements on wireless communication systems. In a fifth generation (5th generation, 5G) communication system, a point-to-point single link communication mode is used between terminal devices or between a terminal device and a network device. Each carrier or each cell has a control channel and a data channel, and a control channel occupies a large proportion in time domain. As a result, overheads of common control information are excessively high. Due to mobility of a terminal device, cell handover occurs when the terminal device moves across cells. Therefore, a large amount of control signaling needs to be exchanged between the terminal device and a network device. As a result, signaling overheads are excessively high, and service experience of the terminal device is affected.

Therefore, a conventional wireless network architecture and a communication procedure need to be further optimized to satisfy more communication requirements.

SUMMARY

This application provides a data transmission method and a data transmission apparatus, to optimize a wireless network architecture and a data transmission procedure in the wireless network architecture, to satisfy more communication requirements.

According to a first aspect, a data transmission method is provided, including: A terminal device sends selection information to a control plane access network device, where the selection information indicates a target user plane access network device, and the target user plane access network device is determined from at least one user plane access network device based on system information and a user plane access network device selection rule. The terminal device receives first timing advance (TA) information and first radio bearer configuration information that are from the control plane access network device, where the first TA information indicates a TA value of the terminal device on the target user plane access network device, and the first radio bearer configuration information indicates a data radio bearer (DRB) allocated by the target user plane access network device to the terminal device. The terminal device performs data transmission with the target user plane access network device based on the first TA information and the first radio bearer configuration information.

It should be understood that the system information and the user plane access network device selection rule may be sent by the control plane access network device in a broadcast message. The system information may include a MIB and/or a SIB of at least one user plane access network device. The user plane access network device selection rule may be factors such as signal quality and a load status of the user plane access network device that are measured by the terminal device.

The data transmission method in embodiments of this application can establish a radio bearer for a data plane based on a new wireless network architecture (that is, a network architecture in which a control plane and a user plane are separated) to implement data transmission. Common control information is provided by using one control plane access network device, so that common control overheads can be effectively reduced, and system performance can be improved.

With reference to the first aspect, in some implementations of the first aspect, that a terminal device sends selection information to a control plane access network device includes: The terminal device sends a random access preamble to the control plane access network device, where the random access preamble indicates the target user plane access network device. That the terminal device receives first timing advance TA information from the control plane access network device includes: The terminal device receives a random access response (RAR) message from the control plane access network device, where the RAR message includes the first TA information. The method further includes: The terminal device sends a radio resource control (RRC) connection setup request message to the control plane access network device. That the terminal device receives first radio bearer configuration information from the control plane access network device includes: The terminal device receives an RRC connection setup message or an RRC connection reconfiguration message from the control plane access network device, where the RRC connection setup message or the RRC connection reconfiguration message carries the first radio bearer configuration information.

In embodiments of this application, the selection information is notified to the control plane access network device based on the random access preamble, and the first TA information is obtained by using the random access response message, so that the terminal device can be enabled to establish a data plane on the target user plane access network device. The new wireless network architecture can reduce common control overheads and improve user experience.

With reference to the first aspect, in some implementations of the first aspect, a random access resource of the control plane access network device corresponds to the at least one user plane access network device. The random access preamble is sent on a random access resource corresponding to the target user plane access network device.

Because the random access preamble is sent on the random access resource corresponding to the target user plane access network device, the control plane access network device may directly determine, based on the random access resource, the target user plane access network device selected by the terminal device. Additional indication information is not required. In this way, signaling overheads can be effectively reduced, and user experience can be improved.

With reference to the first aspect, in some implementations of the first aspect, the method further includes: The terminal device sends a random access preamble to the control plane access network device. The terminal device receives a RAR message from the control plane access network device. That a terminal device sends selection information to a control plane access network device includes: The terminal device sends an RRC connection setup request message to the control plane access network device, where the RRC connection setup request message includes the selection information. That the terminal device receives first timing advance TA information and first radio bearer configuration information that are from the control plane access network device includes: The terminal device receives an RRC connection setup message or an RRC connection reconfiguration message from the control plane access network device, where the RRC connection setup message or the RRC connection reconfiguration message includes the first TA information and/or the first radio bearer configuration information. Alternatively, the terminal device receives an RRC connection setup message and an RRC connection reconfiguration message that are from the control plane access network device, where the RRC connection setup message includes the first TA information, and the RRC connection reconfiguration message carries the first radio bearer configuration information.

In embodiments of this application, the selection information is notified to the control plane access network device based on the RRC connection setup request message, and the first TA information is obtained by using the RRC connection setup message or the RRC connection reconfiguration message, so that the terminal device can be enabled to establish a data plane on the target user plane access network device. The new wireless network architecture can reduce common control overheads and improve user experience.

In embodiments of this application, the first TA information and the first radio bearer configuration information may be sent in a same message, or may be respectively sent in two different messages. This is not limited in embodiments of this application.

With reference to the first aspect, in some implementations of the first aspect, the RAR message further includes second TA information, and the second TA information indicates a TA value of the terminal device on the control plane access network device; and the RRC connection setup message further includes second radio bearer configuration information, and the second radio bearer configuration information indicates a signaling radio bearer SRB allocated by the control plane access network device to the terminal device.

It should be understood that the terminal device may obtain the second TA information and the second radio bearer configuration information in the foregoing process, so that the terminal device establishes an RRC connection to the control plane access network device.

According to a second aspect, another data transmission method is provided, including: A control plane access network device receives selection information from a terminal device, where the selection information indicates a target user plane access network device, and the target user plane access network device is determined from at least one user plane access network device based on system information and a user plane access network device selection rule. The control plane access network device obtains first timing advance TA information and first radio bearer configuration information from the target user plane access network device, where the first TA information indicates a TA value of the terminal device on the target user plane access network device, and the first radio bearer configuration information indicates a data radio bearer DRB allocated by the target user plane access network device to the terminal device. The control plane access network device sends the first TA information and the first radio bearer configuration information to the terminal device.

With reference to the second aspect, in some implementations of the second aspect, that a control plane access network device receives selection information from a terminal device includes: The control plane access network device receives a random access preamble from the terminal device, where the random access preamble indicates the target user plane access network device. That the control plane access network device obtains first TA information from the terminal device includes: The control plane access network device sends a random access response RAR message to the terminal device, where the RAR message carries the first TA information. The method further includes: The control plane access network device receives a radio resource control RRC connection setup request message from the terminal device. That the control plane access network device sends the first radio bearer configuration information to the terminal device includes: The control plane access network device sends an RRC connection setup message or an RRC connection reconfiguration message to the terminal device, where the RRC connection setup message or the RRC connection reconfiguration message carries the first radio bearer configuration information.

With reference to the second aspect, in some implementations of the second aspect, a random access resource of the control plane access network device corresponds to the at least one user plane access network device. The random access preamble is sent on a random access resource corresponding to the target user plane access network device.

With reference to the second aspect, in some implementations of the second aspect, that the control plane access network device obtains first timing advance TA information and first radio bearer configuration information from the target user plane access network device includes: The control plane access network device sends first indication information to the target user plane access network device, where the first indication information indicates a random access resource selected by the terminal device. The control plane access network device receives the first TA information and the first radio bearer configuration information from the target user plane access network device.

With reference to the second aspect, in some implementations of the second aspect, the method further includes: The control plane access network device receives a random access preamble from the terminal device. The control plane access network device sends a RAR message to the terminal device. That a control plane access network device receives selection information from a terminal device includes: The control plane access network device receives an RRC connection setup request message from the terminal device, where the RRC connection setup request message includes the selection information. That the control plane access network device sends the first TA information and the first radio bearer configuration information to the terminal device includes: The control plane access network device sends an RRC connection setup message or an RRC connection reconfiguration message to the terminal device, where the RRC connection setup message or the RRC connection reconfiguration message includes the first TA information and/or the first radio bearer configuration information. Alternatively, the control plane access network device sends an RRC connection setup message and an RRC connection reconfiguration message to the terminal device, where the RRC connection setup message includes the first TA information, and the RRC connection reconfiguration message includes the first radio bearer configuration information.

With reference to the second aspect, in some implementations of the second aspect, that the control plane access network device obtains first timing advance TA information and first radio bearer configuration information from the target user plane access network device includes: The control plane access network device sends a user plane addition request message to the target user plane access network device based on the RRC connection setup request message. The control plane access network device receives a user plane addition acknowledgment message from the target user plane access network device, where the user plane addition acknowledgment message carries the first TA information and the first radio bearer configuration information.

With reference to the second aspect, in some implementations of the second aspect, the RAR message further includes second TA information, and the second TA information indicates a TA value of the terminal device on the control plane access network device. The RRC connection setup message further includes second radio bearer configuration information, and the second radio bearer configuration information indicates a signaling radio bearer SRB allocated by the control plane access network device to the terminal device.

According to a third aspect, a data transmission apparatus is provided. The apparatus includes: a sending module, configured to send selection information to a control plane access network device, where the selection information indicates a target user plane access network device, and the target user plane access network device is determined from at least one user plane access network device based on system information and a user plane access network device selection rule; and a receiving module, configured to receive first timing advance TA information and first radio bearer configuration information that are from the control plane access network device, where the first TA information indicates a TA value of the apparatus on the target user plane access network device, and the first radio bearer configuration information indicates a data radio bearer DRB allocated by the target user plane access network device to the apparatus, where the sending module and/or the receiving module are/is further configured to perform data transmission with the target user plane access network device based on the first TA information and the first radio bearer configuration information.

With reference to the third aspect, in some implementations of the third aspect, the sending module is specifically configured to send a random access preamble to the control plane access network device, where the random access preamble indicates the target user plane access network device. The receiving module is specifically configured to receive a random access response RAR message from the control plane access network device, where the RAR message includes the first TA information. The sending module is further configured to send a radio resource control RRC connection setup request message to the control plane access network device. The receiving module is specifically configured to receive an RRC connection setup message or an RRC connection reconfiguration message from the control plane access network device, where the RRC connection setup message or the RRC connection reconfiguration message carries the first radio bearer configuration information.

With reference to the third aspect, in some implementations of the third aspect, a random access resource of the control plane access network device corresponds to the at least one user plane access network device. The random access preamble is sent on a random access resource corresponding to the target user plane access network device.

With reference to the third aspect, in some implementations of the third aspect, the sending module is further configured to send a random access preamble to the control plane access network device. The receiving module is further configured to receive a RAR message from the control plane access network device. The sending module is further configured to send an RRC connection setup request message to the control plane access network device, where the RRC connection setup request message includes the selection information. The receiving module is further configured to: receive an RRC connection setup message or an RRC connection reconfiguration message from the control plane access network device, where the RRC connection setup message or the RRC connection reconfiguration message includes the first TA information and/or the first radio bearer configuration information; or receive an RRC connection setup message and an RRC connection reconfiguration message that are from the control plane access network device, where the RRC connection setup message includes the first TA information, and the RRC connection reconfiguration message carries the first radio bearer configuration information.

With reference to the third aspect, in some implementations of the third aspect, the RAR message further includes second TA information, and the second TA information indicates a TA value of the apparatus on the control plane access network device. The RRC connection setup message further includes second radio bearer configuration information, and the second radio bearer configuration information indicates a signaling radio bearer SRB allocated by the control plane access network device to the apparatus.

According to a fourth aspect, another data transmission apparatus is provided. The apparatus includes: a receiving module, configured to: receive selection information from a terminal device, where the selection information indicates a target user plane access network device, and the target user plane access network device is determined from at least one user plane access network device based on system information and a user plane access network device selection rule; and obtain first timing advance TA information and first radio bearer configuration information from the target user plane access network device, where the first TA information indicates a TA value of the terminal device on the target user plane access network device, and the first radio bearer configuration information indicates a data radio bearer DRB allocated by the target user plane access network device to the terminal device; and a sending module, configured to send the first TA information and the first radio bearer configuration information to the terminal device.

With reference to the fourth aspect, in some implementations of the fourth aspect, the receiving module is specifically configured to receive a random access preamble from the terminal device, where the random access preamble indicates the target user plane access network device. The sending module is specifically configured to send a random access response RAR message to the terminal device, where the RAR message carries the first TA information. The receiving module is further configured to receive a radio resource control RRC connection setup request message from the terminal device. The sending module is specifically configured to send an RRC connection setup message or an RRC connection reconfiguration message to the terminal device, where the RRC connection setup message or the RRC connection reconfiguration message carries the first radio bearer configuration information.

With reference to the fourth aspect, in some implementations of the fourth aspect, a random access resource of the apparatus corresponds to the at least one user plane access network device. The random access preamble is sent on a random access resource corresponding to the target user plane access network device.

With reference to the fourth aspect, in some implementations of the fourth aspect, the sending module is further configured to send first indication information to the target user plane access network device, where the first indication information indicates a random access resource selected by the terminal device. The receiving module is further configured to receive the first TA information and the first radio bearer configuration information from the target user plane access network device.

With reference to the fourth aspect, in some implementations of the fourth aspect, the receiving module is further configured to receive a random access preamble from the terminal device. The sending module is further configured to send a RAR message to the terminal device. The receiving module is further configured to receive an RRC connection setup request message from the terminal device, where the RRC connection setup request message includes the selection information. The sending module is further configured to: send an RRC connection setup message or an RRC connection reconfiguration message, where the RRC connection setup message or the RRC connection reconfiguration message includes the first TA information and/or the first radio bearer configuration information; or send an RRC connection setup message and an RRC connection reconfiguration message to the terminal device, where the RRC connection setup message includes the first TA information, and the RRC connection reconfiguration message includes the first radio bearer configuration information.

With reference to the fourth aspect, in some implementations of the fourth aspect, the obtaining module is further configured to: send a user plane addition request message to the target user plane access network device based on the RRC connection setup request message; and receive a user plane addition acknowledgment message from the target user plane access network device, where the user plane addition acknowledgment message carries the first TA information and the first radio bearer configuration information.

With reference to the fourth aspect, in some implementations of the fourth aspect, the RAR message further includes second TA information, and the second TA information indicates a TA value of the terminal device on the apparatus. The RRC connection setup message further includes second radio bearer configuration information, and the second radio bearer configuration information indicates a signaling radio bearer SRB allocated by the apparatus to the terminal device.

According to a fourth aspect, another data transmission apparatus is provided, including a processor. The processor is coupled to a memory and may be configured to execute instructions in the memory, to implement the method in any one of the first aspect or the possible implementations of the first aspect. In a possible implementation, the apparatus further includes a memory. In a possible implementation, the apparatus further includes a communication interface, and the processor is coupled to the communication interface.

In an implementation, the apparatus is a terminal device. When the apparatus is a terminal device, the communication interface may be a transceiver or an input/output interface.

In another implementation, the apparatus is a chip configured in a terminal device. When the apparatus is a chip configured in a terminal device, the communication interface may be an input/output interface.

According to a fifth aspect, another data transmission apparatus is provided, including a processor. The processor is coupled to a memory and may be configured to execute instructions in the memory, to implement the method in any one of the second aspect or the possible implementations of the second aspect. In a possible implementation, the apparatus further includes a memory. In a possible implementation, the apparatus further includes a communication interface, and the processor is coupled to the communication interface.

In an implementation, the apparatus is a network device. When the apparatus is a network device, the communication interface may be a transceiver or an input/output interface.

In another implementation, the apparatus is a chip configured in a network device. When the apparatus is a chip configured in a network device, the communication interface may be an input/output interface.

According to a sixth aspect, a processor is provided, including an input circuit, an output circuit, and a processing circuit. The processing circuit is configured to: receive a signal by using the input circuit, and transmit a signal by using the output circuit, so that the processor performs the method in any possible implementation of the foregoing aspects.

In a specific implementation process, the processor may be a chip, the input circuit may be an input pin, the output circuit may be an output pin, and the processing circuit may be a transistor, a gate circuit, a flip-flop, various logic circuits, or the like. An input signal received by the input circuit may be received and inputted by, for example, but not limited to, a receiver. A signal outputted by the output circuit may be, for example, but not limited to, a signal outputted to the transmitter and transmitted by the transmitter. The input circuit and the output circuit may be a same circuit. The circuit is used as the input circuit and the output circuit at different moments. Specific implementations of the processor and various circuits are not limited in this application.

According to a seventh aspect, a processing apparatus is provided, including a processor and a memory. The processor is configured to: read instructions stored in the memory, receive a signal by using a receiver, and transmit a signal by using a transmitter, to perform the method in any possible implementation of the foregoing aspects.

In a possible implementation, one or more processors are provided, and one or more memories are provided.

In a possible implementation, the memory and the processor may be integrated together, or the memory and the processor are disposed separately.

In a specific implementation process, the memory may be a non-transitory (non-transitory) memory, for example, a read-only memory (read-only memory, ROM). The memory and the processor may be integrated on a same chip, or may be separately disposed on different chips. A type of the memory and a manner of arranging the memory and the processor are not limited in this application.

It should be understood that for a related data exchange process, for example, sending of indication information may be a process of outputting indication information from the processor, and receiving of capability information may be a process of receiving inputted capability information by the processor. Specifically, data outputted through processing may be outputted to the transmitter, and input data received by the processor may be from the receiver. The transmitter and the receiver may be collectively referred to as a transceiver.

The processing apparatus may be a chip. The processor may be implemented by using hardware or software. When implemented by using hardware, the processor may be a logic circuit, an integrated circuit, or the like. When being implemented by using software, the processor may be a general-purpose processor and is implemented by reading software code stored in the memory. The memory may be integrated into the processor or may be located outside the processor and exists independently.

According to an eighth aspect, a computer program product is provided. The computer program product includes a computer program (which may also be referred to as code or instructions). When the computer program is run, a computer is enabled to perform the method in any possible implementation of the foregoing aspects.

According to a ninth aspect, a computer-readable storage medium is provided. The computer-readable storage medium stores a computer program (which may also be referred to as code or instructions). When the computer program is run on a computer, the computer is enabled to perform the method in any possible implementation of the foregoing aspects.

BRIEF DESCRIPTION OF DRAWINGS

FIG. 17 is a schematic diagram in which one sNB provides data plane services for two cNBs according to an embodiment of this application;

FIG. 18 is a schematic diagram of a format in which first TA information is carried in a MAC RAR according to an embodiment of this application;

FIG. 19 is a schematic diagram of another format in which first TA information is carried in a MAC RAR according to an embodiment of this application;

DETAILED DESCRIPTION

The technical solutions in this application are described below with reference to the accompanying drawings.

Technical solutions provided in this application may be applied to various communication systems, for example, a long term evolution (LTE) system, an LTE frequency division duplex (FDD) system, an LTE time division duplex (TDD) system, a fifth generation (5G) mobile communication system, a new radio (NR) system or another evolved communication system, and a next-generation mobile communication system of a 5G communication system.

Figure 1:
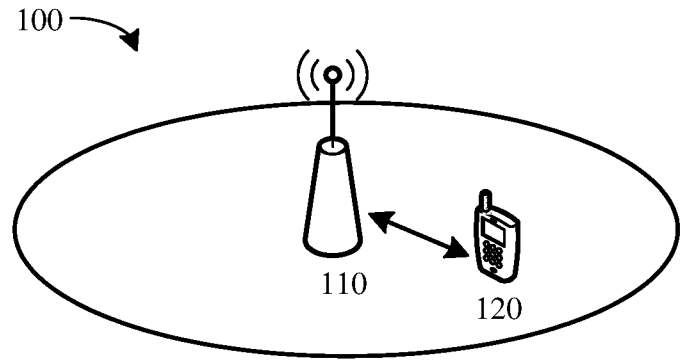
FIG. 1 is a schematic diagram of a communication system according to an embodiment of this application.

To facilitate understanding of the technical solutions provided in this application, a communication system applicable to embodiments of this application is first described in detail with reference to FIG. 1. FIG. 1 is a schematic diagram of a communication system 100 applicable to a data transmission method and apparatus according to embodiments of this application. As shown in FIG. 1, the communication system 100 may include at least one network device, for example, a network device 110 shown in FIG. 1. The communication system 100 may further include at least one terminal device, for example, a terminal device 120 shown in FIG. 1. The network device 110 may communicate with the terminal device 120 through a wireless link. A plurality of antennas may be configured for each communications device, for example, the network device 110 or the terminal device 120. The plurality of antennas may include at least one transmit antenna configured to send a signal and at least one receive antenna configured to receive a signal. In addition, each communication device further includes a transmitter chain and a receiver chain. A person of ordinary skill in the art may understand that each of the transmitter chain and the receiver chain may include a plurality of components (for example, a processor, a modulator, multiplexer, a demodulator, a demultiplexer, or an antenna) related to signal sending and signal receiving. Therefore, the network device 110 and the terminal device 120 may communicate with each other by using a multi-antenna technology.

The terminal device in embodiments of this application may also be referred to as user equipment (UE), a mobile station (MS), a mobile terminal (MT), an access terminal, a subscriber unit, a subscriber station, a mobile station, a mobile station, a remote station, a remote terminal, a mobile device, a user terminal, a terminal, a wireless communication device, a user agent, or a user device.

The terminal device may be a device that provides voice/ data connectivity for a user, for example, a handheld device or a vehicle-mounted device with a wireless connection function. Currently, examples of some terminal devices include: a mobile phone (mobile phone), a tablet computer, a notebook computer, a palmtop computer, a mobile internet device (MID), a wearable device, a virtual reality (VR) device, an augmented reality (AR) device, a wireless terminal in industrial control (industrial control), a wireless terminal in self driving (self driving), a wireless terminal in remote medical surgery (remote medical surgery), a wireless terminal in a smart grid (smart grid), a wireless terminal in transportation safety (transportation safety), a wireless terminal in a smart city (smart city), a wireless terminal in a smart home (smart home), a cellular phone, a cordless phone, a session initiation protocol (session initiation protocol, SIP) phone, a wireless local loop (WLL) station, a personal digital assistant (PDA), a handheld device with a wireless communication capability, a computing device or another processing device connected to a wireless modem, a vehicle-mounted device, a wearable device, a terminal device in a 5G network, a terminal device in a future evolved public land mobile network (PLMN), or the like. This is not limited in this application.

As an example instead of a limitation, in this application, the terminal device may be a terminal device in an internet of things (IoT) system. The internet of things is an important part of the future information technology development. Its main technical feature is to connect articles and networks through communication technology, to implement an intelligent network of man-machine interconnection and interconnection of things. For example, the terminal device in embodiments of this application may be a wearable device. The wearable device may also be referred to as a wearable smart device, and is a general term for wearable devices developed by intelligently designing daily wear by using a wearable technology, for example, glasses, gloves, watches, clothing, and shoes. The wearable device is a portable device that can be directly worn on a body or integrated into clothes or accessories of a user. Wearable devices are not only hardware devices, and can implement powerful functions through software support, data interaction, and cloud interaction. In a broad sense, the wearable intelligent device includes a full-function and large-size device that can implement complete or partial functions without relying on a smartphone, for example, a smartwatch or smart glasses, and a device that focuses only on a type of application function and that needs to be used together with another device such as a smartphone, for example, a smart band and a smart jewelry for physical sign monitoring.

As an example instead of a limitation, in embodiments of this application, the terminal device may alternatively be a terminal device in machine type communication (MTC). In addition, the terminal device may alternatively be an in-vehicle module, an in-vehicle module, an in-vehicle component, an in-vehicle chip, an in-vehicle unit, or the like built as one or more parts or units in a vehicle. The vehicle may implement the method provided in this application by using the built-in in-vehicle module, in-vehicle module, in-vehicle component, in-vehicle chip, in-vehicle unit, or the like. Therefore, embodiments of this application may also be applied to an internet of vehicles, for example, a vehicle to everything (V2X), a long term evolution-vehicle (LTE-V), or a vehicle-to-vehicle (V2V) technology.

The network device in this application may be a device that communicates with a terminal device. The network device may also be referred to as an access network device or a radio access network device, and may be a transmission reception point (TRP), or may be an evolved NodeB (eNB or eNodeB) in an LTE system, or may be a home NodeB (for example, a home evolved NodeB, or a home NodeB, HNB), or a base band unit (BBU), or may be a radio controller in a cloud radio access network (CRAN) scenario. Alternatively, the network device may be a relay station, an access point, a vehicle-mounted device, a wearable device, a network device in a 5G network, a network device in a future evolved PLMN network, or the like, or may be an access point (AP) in a WLAN, or may be a gNB in an NR system. Alternatively, the network device may be a metro base station, a micro base station, a pico base station, a femto base station, or the like. This is not limited in this application.

In a network structure, the network device may include a central unit (CU) node, a distributed unit (DU) node, or a radio access network (RAN) device including a CU node and a DU node, or a RAN device including a control plane CU node (CU-CP node), a user plane CU node (CU-UP node), and a DU node.

The network device provides a service for a cell, and the terminal device communicates with a cell by using a transmission resource (for example, a frequency domain resource, or a spectrum resource) allocated by the network device. The cell may belong to a macro base station (for example, a macro eNB or a macro gNB), or may belong to a base station corresponding to a small cell (small cell). The small cell may include a metro cell (metro cell), a micro cell (micro cell), a pico cell (pico cell), a femto cell (femto cell), and the like. These small cells have characteristics of small coverage area and low transmit power, and are applicable to providing a high-speed data transmission service.

It should be understood that FIG. 1 is merely a schematic diagram, and the communication system 100 may further include another device that is not shown. In addition, a quantity of terminal devices and a quantity of network devices included in the communication system 100 are not limited in embodiments of this application.

In embodiments of this application, the terminal device or the network device includes a hardware layer, an operating system layer running above the hardware layer, and an application layer running above the operating system layer. The hardware layer includes hardware such as a central processing unit (CPU), a memory management unit (MMU), and a memory (also referred to as main memory). The operating system may be any one or more computer operating systems that implement service processing by using a process (process), for example, a Linux operating system, a Unix operating system, an Android operating system, an iOS operating system, or a Windows operating system. The application layer includes applications such as a browser, an address book, word processing software, and instant messaging software. In addition, a specific structure of an execution body of the method provided in this application is not particularly limited in this application, provided that communication can be performed according to the method provided in embodiments of this application by running a program that records code of the method provided in this application. For example, the method provided in embodiments of this application may be executed by a terminal device or a network device, or a functional module that is in the terminal device or the network device and that can invoke a program and execute the program.

In addition, various aspects or features of this application may be implemented as methods, apparatuses, or articles of manufacture using standard programming and/or engineering techniques. The term "article of manufacture" as used in this application covers a computer program accessible from any computer-readable device, carrier, or medium. For example, the computer-readable storage medium may include, but is not limited to, a magnetic storage device (for example, a hard disk, a floppy disk, or a magnetic tape), an optical disc (for example, a compact disc (CD), a digital versatile disc (DVD), or the like), a smart card, and a flash memory device (for example, an erasable programmable read-only memory (EPROM), a card, a stick, or a key drive). In addition, the various storage media described herein may represent one or more devices and/or other machine-readable media for storing information. The term "machine-readable medium" may include, but is not limited to, wireless channels and various other media capable of storing, containing, and/or carrying instructions and/or data.

Figure 3:
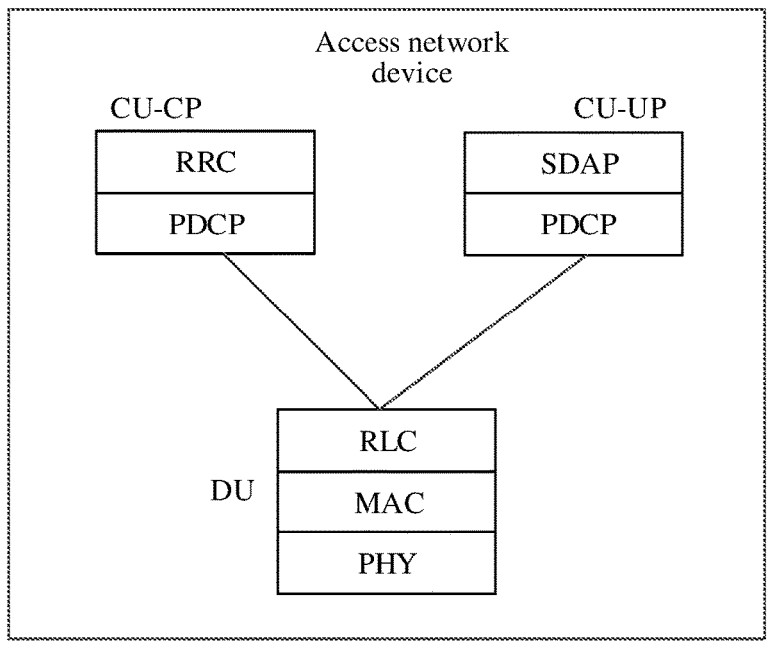
FIG. 3 is a schematic diagram of a protocol stack of an access network device according to an embodiment of this application.
Figure 4:
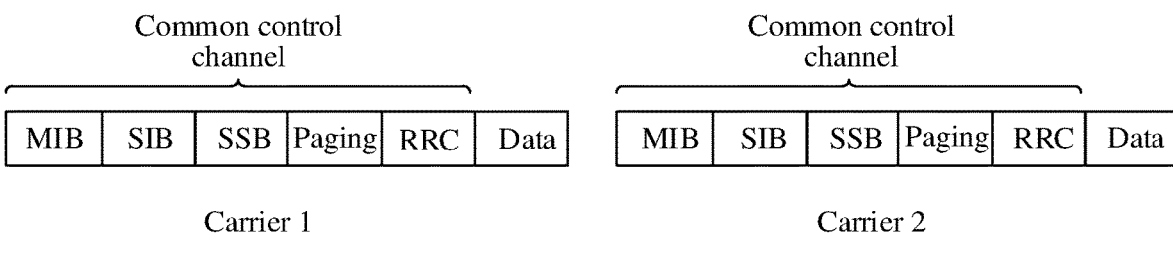
FIG. 4 is a schematic diagram of a carrier relationship according to an embodiment of this application.

For ease of understanding of the embodiments of this application, a current architecture of an access network device is first described with reference to FIG. 2 to FIG. 4.

Figure 2:
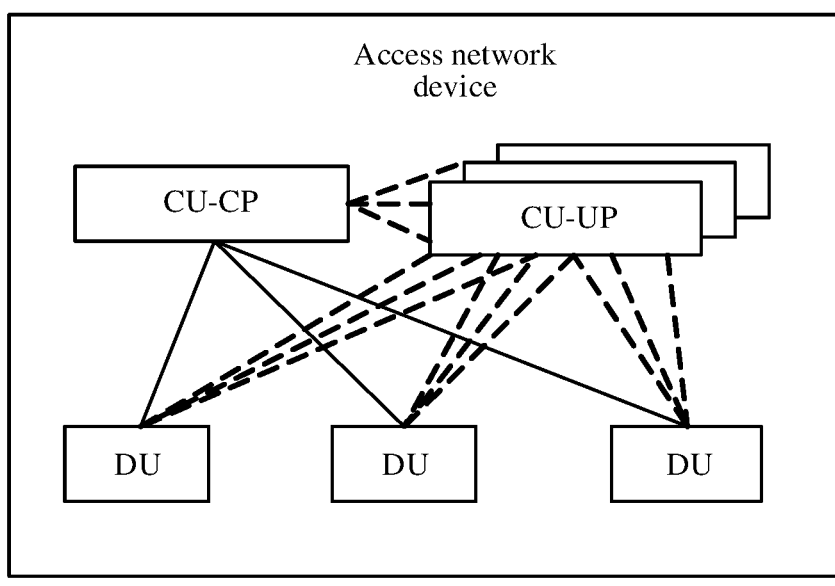
FIG. 2 is a schematic diagram of a structure of an access network device according to an embodiment of this application.

FIG. 2 is a schematic diagram of a structure of an access network device in a 5G system. FIG. 3 is a schematic diagram of a protocol stack of the access network device in the 5G system corresponding to FIG. 2. As shown in FIG. 2, the access network device may include a central unit (CU) and a distributed unit (DU). One CU may be connected to one or more DUs, and one DU is connected to only one CU, that is, there is a one-to-many relationship between CUs and DUs. A user plane and a control plane are decoupled on the CU to form a CU-control plane CP) and a CU-user plane (UP), to form the structure in FIG. 2. With reference to the protocol stack shown in FIG. 3, it can be learned that the CU is responsible for processing a non-real-time protocol and a service, and the CU-CP mainly performs a control plane function, and is configured to implement a radio resource control (RRC) layer and a packet data convergence protocol (PDCP) layer. The CU-UP mainly performs a user plane function, and is configured to implement functions of a service data adaptation protocol (SDAP) layer and the PDCP layer. The CU-CP and the CU-UP may be connected by an E1 interface. The DU is responsible for processing a physical layer protocol and a real-time service, and is configured to implement functions of a radio link control (RLC) layer, a media access control (MAC) layer, and a physical (PHY) layer.

In the foregoing architecture, separation of the control plane and the user plane is implemented in the CU part, that is, the CU-CP part and the CU-UP part, but separation of the control plane and the user plane is not implemented in the DU part. Therefore, in terms of a frame structure, each carrier/cell has a control channel and a data channel. As shown in FIG. 4, a carrier 1 includes a common control channel part and a data part, and a carrier 2 also includes a common control channel part and a data part. The common control channel includes a master information block (MIB), a system information block (SIB), a synchronization signal block (SS/PBCH block, SSB), a paging message, a radio resource control (RRC) message, and the like. Therefore, each carrier has a common control channel, and in extreme cases, a maximum proportion of time domain may reach 40%, resulting in excessive overheads of common control signaling. In addition, when the terminal device moves across cells, RRC handover and reconfiguration need to be completed, a system message needs to be re-obtained, and the like. This affects service experience of the terminal device.

Therefore, in embodiments of this application, based on the CU-DU separated architecture and the CU-CP and CU-UP architecture in the 5G system, a user plane and a control plane are decoupled on the DU, so that the access network device includes a control plane part and a user plane part. The control plane part includes a CU-CP and a DU-CP, and the user plane part includes a CU-UP and a DU-UP.

Figure 5:
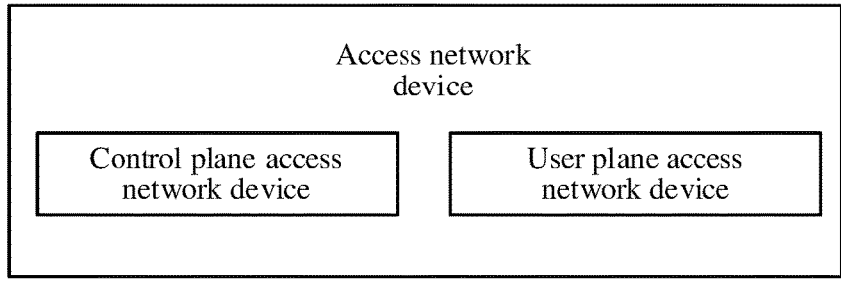
FIG. 5 is another schematic diagram of a structure of an access network device according to an embodiment of this application.

FIG. 5 is a schematic diagram of a structure of an access network device according to an embodiment of this application. As shown in FIG. 5, the access network device includes a control plane access network device (that is, the foregoing control plane part) and a user plane access network device (that is, the foregoing user plane part). The control plane access network device is configured to implement a control plane related function. The user plane access network device is configured to implement a user plane related function.

Figure 6:
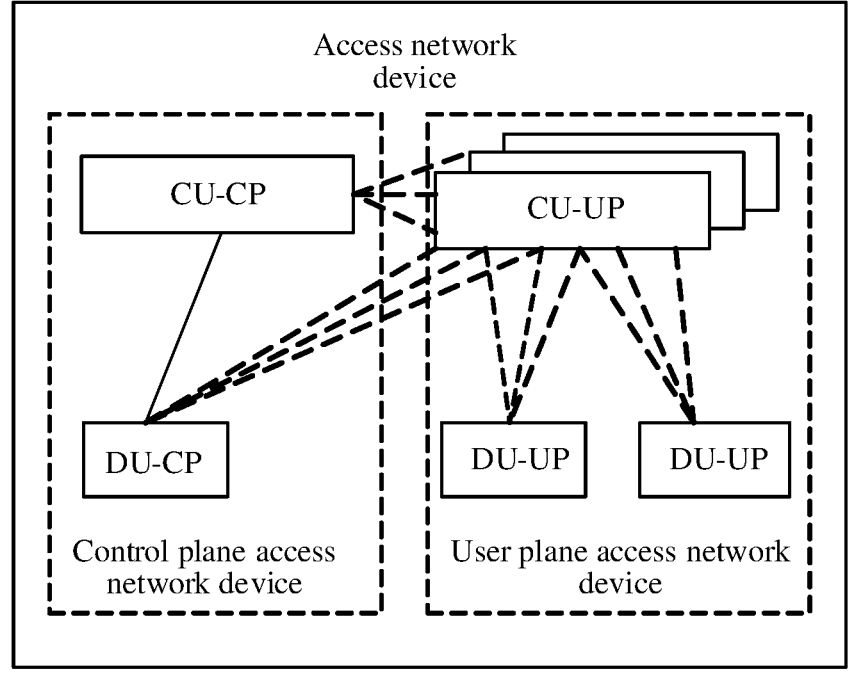
FIG. 6 is still another schematic diagram of a structure of an access network device according to an embodiment of this application.

For example, FIG. 6 shows a specific structure of an access network device according to an embodiment of this application. In FIG. 6, the control plane access network device includes a CU-CP and a DU-CP, and the user plane access network device includes a CU-UP and a DU-UP.

The control plane access network device and the user plane access network device may separately have some protocol layer functions. The control plane access network device may have functions of one or more of the following protocol layers: an RRC layer, a PDCP layer, an RLC layer, a MAC layer, or a PHY layer. The user plane access network device may have functions of one or more of the following protocol layers: an SDAP layer, a PDCP layer, an RLC layer, a MAC layer, or a PHY layer.

Figures 7, 8:
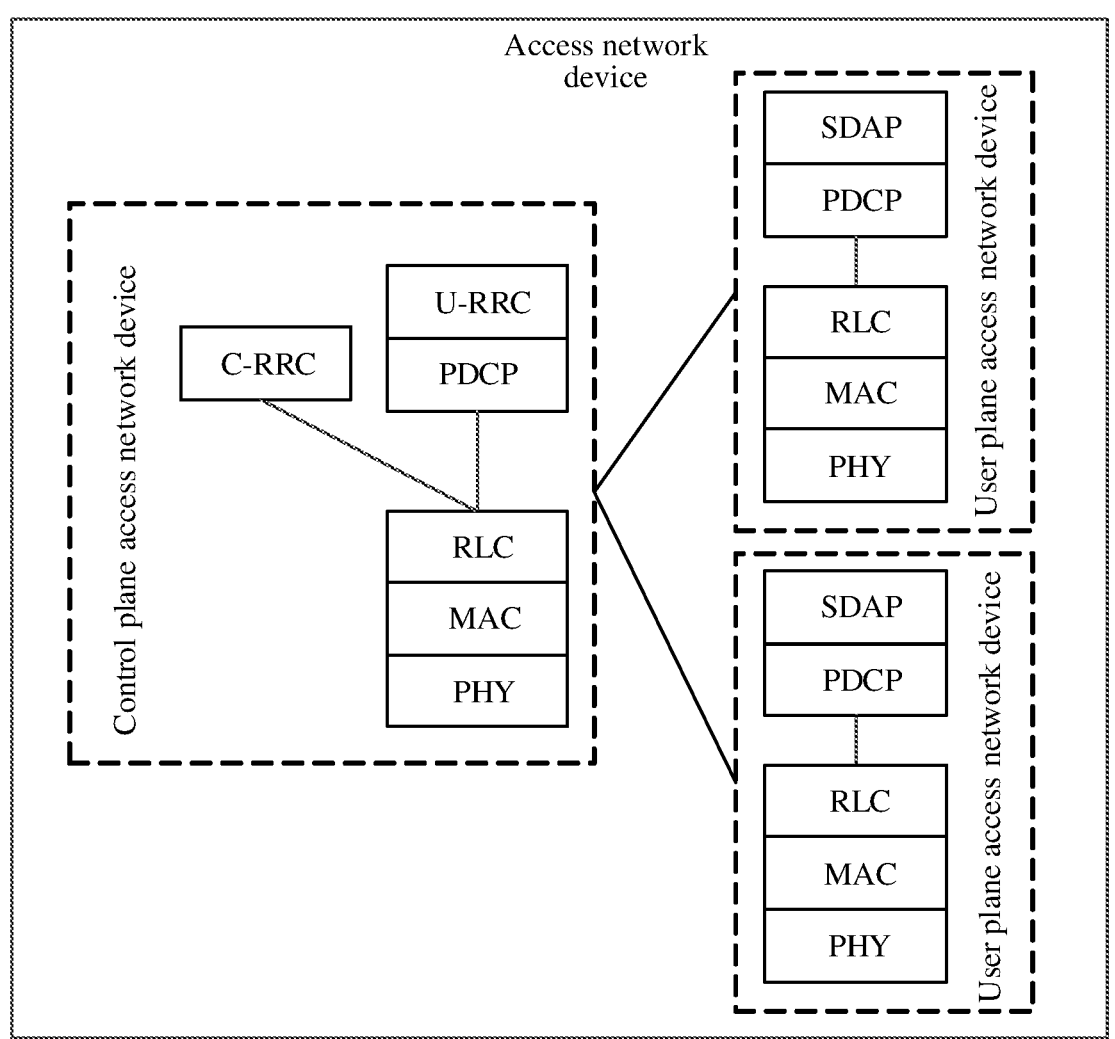
FIG. 7 is a schematic diagram of another protocol stack of an access network device according to an embodiment of this application.
FIG. 8 is a schematic diagram of a protocol stack of a control plane and a user plane according to an embodiment of this application.

In a possible design, as shown in FIG. 7, the control plane access network device has functions of the following several protocol layers: an RRC layer, a PDCP layer, an RLC layer, a MAC layer, and a PHY layer. The user plane access network device has functions of several following protocol layers: an SDAP layer, a PDCP layer, an RLC layer, a MAC layer, and a PHY layer. The functions of the protocol layers in the control plane access network device and the user plane access network device are independent of each other. For example, the control plane access network device has independent functions of an RLC layer, a MAC layer, and a PHY layer. The user plane access network device has independent functions of an RLC layer, a MAC layer, and a PHY layer. For ease of illustration, in FIG. 7, an example in which one control plane access network device is connected to two user plane access network devices is used to provide an example of a protocol layer. The RRC may be classified into a control plane RRC (C-RRC) and a user plane RRC (U-RRC). The C-RRC is used to transmit a common control message, for example, a SIB, a MIB, or a paging message. The U-RRC is used to transfer an RRC control message of the terminal device. The protocol layer of the user plane access network device is used to transmit data of the terminal device. In a CU-DU separated architecture, a C-RRC, a U-RRC, and a PDCP corresponding to the U-RRC are located in a CU-CP, and the DU-CP includes an RLC layer, a MAC layer, and a PHY layer corresponding to a control plane. The SDAP layer and the PDCP layer are located in the CU-UP, and the RLC layer, the MAC layer, and the PHY layer corresponding to the user plane are located in a U-DU.

In a possible design, as shown in FIG. 8, the terminal device may maintain an RRC connection by using a control plane access network device, and perform user plane multiple connections by connecting to a plurality of user plane access network devices. In this case, the plurality of user plane access network devices have separate functions of an RLC layer, a MAC layer, and a PHY layer, and the plurality of user plane access network devices have functions of a same SDAP layer and a same PDCP layer. In the protocol stack, data of the terminal device may be aggregated from different DU-UPs to a PDCP layer of a same CU-UP. FIG. 8 shows a protocol layer of an access network device by using an example in which a terminal device is connected to two user plane access network devices to perform user plane multiple connections.

Figures 9, 10:
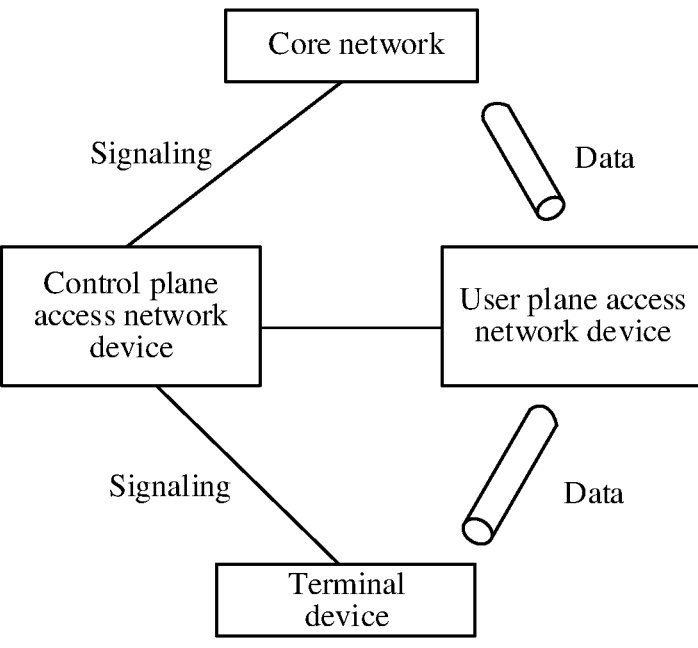
FIG. 9 is a schematic diagram of another protocol stack of a control plane and a user plane according to an embodiment of this application.
FIG. 10 is a schematic diagram of a connection relationship between devices according to an embodiment of this application.

In a possible design, as shown in FIG. 9, the terminal device maintains an RRC connection by using a control plane access network device, and performs user plane carrier aggregation by connecting to a plurality of user plane access network devices. In this case, the plurality of user plane access network devices have separate functions of a PHY layer, and the plurality of user plane access network devices have functions of a same SDAP layer, a same PDCP, an RLC layer, and a same MAC layer. In the protocol stack, data of the terminal device may be aggregated from different physical layers to a same MAC layer.

It should be understood that the DU-CP may also be referred to as a control plane-DU (C-DU) or another name, and the DU-UP may also be referred to as a user plane-DU (U-DU) or another name. This is not limited in embodiments of this application.

It should be further understood that both the control plane access network device and the user plane access network device may have other names. This is not limited in this application. For example, the control plane access network device may also be referred to as a cNB, a control base station, a control module, a control device, or a control apparatus. The user plane access network device may also be referred to as an sNB, a serving base station, a data base station, a service module, a service apparatus, a data module, or a data apparatus.

Figures 11, 12:
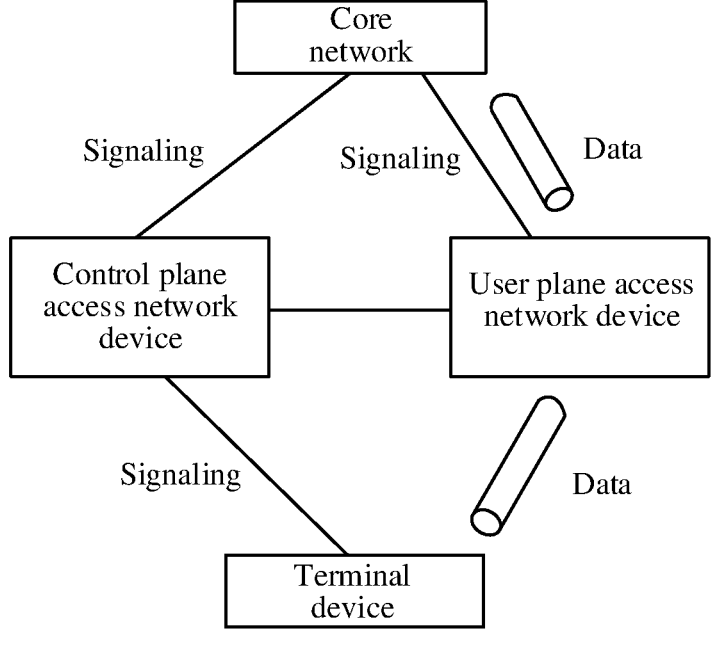
FIG. 11 is a schematic diagram of another connection relationship between devices according to an embodiment of this application.
FIG. 12 is a schematic diagram of another carrier relationship according to an embodiment of this application.

The foregoing communication system may further include a core network (core network, CN). A connection relationship between the terminal device, the control plane access network device, the user plane access network device, and the core network may be shown in FIG. or FIG. 11. As shown in FIG. 10, there is a control plane signaling connection but no data connection between the control plane access network device and the core network. There may be a data connection between the user plane access network device and the core network, but there is no control plane signaling connection between the user plane access network device and the core network. As shown in FIG. 11, there is a control plane signaling connection but no data connection between the control plane access network device and the core network. There may be a data connection and a control plane signaling connection between the user plane access network device and the core network.

Optionally, the access network device in embodiments of this application may further include another unit. For example, the network device may further include an active antenna unit (active antenna unit, AAU). The AAU may implement some physical layer processing functions, radio frequency processing, and a function related to an active antenna.

Based on the foregoing optimized wireless network architecture, the control plane and the data plane are separated. As shown in FIG. 12, a data carrier 1 and a data carrier 2 may share a common control channel on a common control carrier. The common control layer of the control plane may provide network camping and network access for the terminal device, and features wide coverage and mobility. User-plane data transmission may be user-centric. Multiple channels of data can be flexibly coordinated, and capacity gains can be provided in high frequency bands.

The optimized wireless network architecture causes a change to a data transmission process. In view of this, this application provides a data transmission method and apparatus, to satisfy more communication requirements.

Before the method provided in this application is described, the following several points are first described.

First, in this application, "indication" may include a direct indication and an indirect indication, or may include an explicit indication and an implicit indication. Information indicated by specific information is referred to as to-be-indicated information. In a specific implementation process, the to-be-indicated information may be indicated in many manners. For example, without limitation, the to-be-indicated information may be directly indicated, for example, the to-be-indicated information or an index of the to-be-indicated information is indicated. Alternatively, the to-be-indicated information may be indirectly indicated by indicating other information, where an association relationship exists between the other information and the to-be-indicated information. Alternatively, only a part of the to-be-indicated information may be indicated, and another part of the to-be-indicated information is known or agreed in advance. For example, specific information may be indicated by using a pre-agreed (for example, specified in a protocol) arrangement sequence of information, thereby reducing indication overheads to some extent.

Second, in the embodiments shown in this specification, terms and English acronyms, such as a control plane access network device and a target user plane access network device, are examples provided for ease of description, and shall not constitute any limitation on this application. This application does not exclude a possibility of defining another term that can implement a same or similar function in an existing or future protocol.

Third, the first, the second, and various numerical numbers in the embodiments shown below are merely distinguished for ease of description, and are not intended to limit the scope of the embodiments of this application. For example, different information, different TAs, and different radio bearers are distinguished.

Fourth, in the embodiment shown below, "pre-obtaining" may include signaling indication by the network device or predefinition, for example, protocol definition. The "predefinition" may be implemented by pre-storing, in a device (for example, including a terminal device and a network device), corresponding code or a table, or in another manner that may be used to indicate related information. A specific implementation of the "predefinition" is not limited in this application.

Fifth, the "protocol" in embodiments of this application may refer to a standard protocol in the communication field, for example, may include an LTE protocol, an NR protocol, and a related protocol applied to a future communication system. This is not limited in this application.

The embodiments provided in this application are determined below in detail with reference to FIG. 13 to FIG. 19.

In embodiments of this application, a terminal device and an access network device are used as examples for description. It should be understood that the terminal device may be replaced with an apparatus or a chip that can implement a function similar to that of the terminal device, or the access network device may be replaced with an apparatus or a chip that can implement a function similar to that of the access network device. A name of the apparatus or chip is not limited in embodiments of this application.

Figure 13:
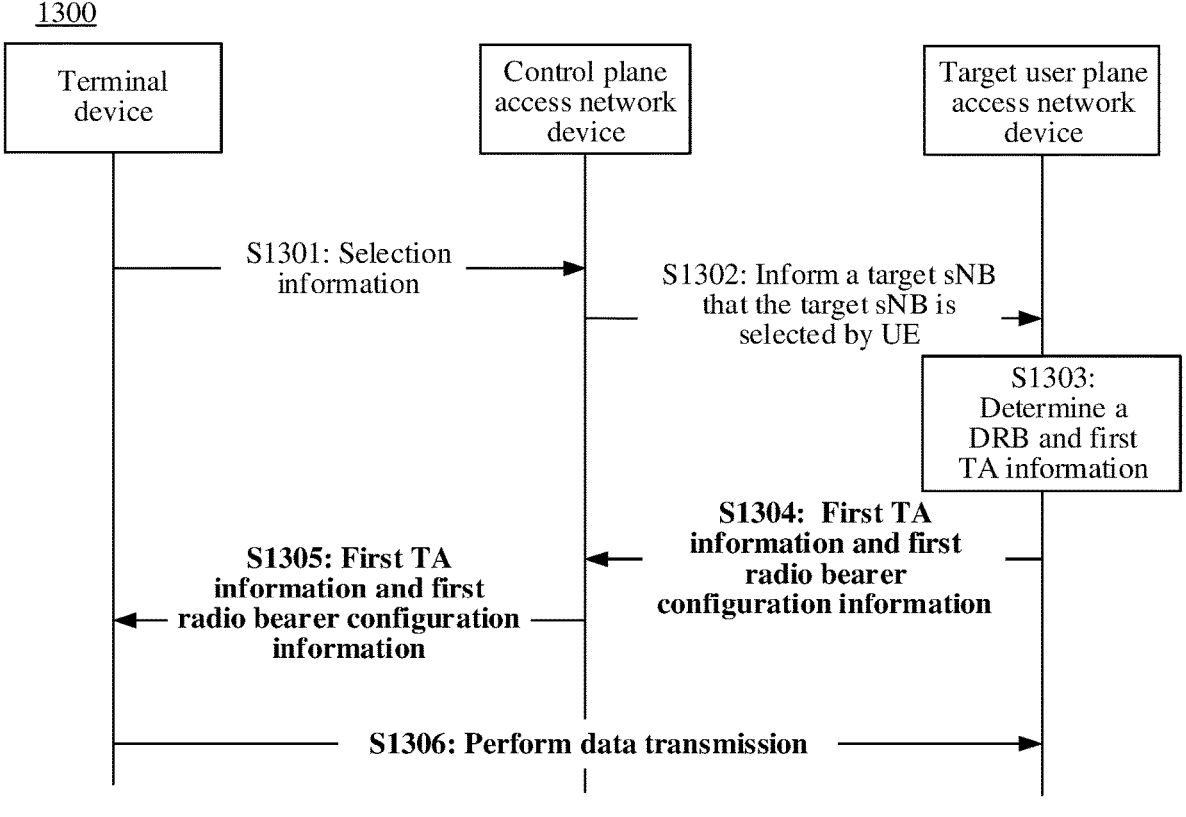
FIG. 13 is a schematic flowchart of a data transmission method according to an embodiment of this application.

FIG. 13 is a schematic flowchart of a data transmission method 1300 according to an embodiment of this application. The method 1300 may be applied to the communication system 100 shown in FIG. 1, or may be applied to another communication system. This is not limited in embodiments of this application. The method 1300 may include the following steps.

S1301: A terminal device sends selection information to a control plane access network device, where the selection information indicates a target user plane access network device. Correspondingly, the control plane access network device receives the selection information.

For example, the selection information indicates a target user plane access network device, and the target user plane access network device is determined from at least one user plane access network device based on system information and a user plane access network device selection rule. It should be understood that the system information and the user plane access network device selection rule may be sent by the control plane access network device in a broadcast message. The system information may include a MIB and/or a SIB of at least one user plane access network device. The user plane access network device selection rule may be factors such as signal quality and a load status of the user plane access network device that are measured by the terminal device.

S1302: The control plane access network device sends, to the target user plane access network device, information used for obtaining a data radio bearer (data radio bearer, DRB) and a timing advance (timing advance, TA). Correspondingly, the target user plane access network device receives the information.

The DRB is a data radio bearer allocated by the target user plane access network device to the terminal device, and is used to transmit data. A value of the foregoing TA may be positive or negative. If the value is positive, it indicates that data sending of the terminal device needs to be advanced. If the value is negative, it indicates that the data sending of the terminal needs to be delayed.

S1303: The target user plane access network device determines a DRB allocated to the terminal device and first TA information, where the first TA information indicates a TA value of the terminal device on the target user plane access network device, and first radio bearer configuration information indicates the DRB allocated by the target user plane access network device to the terminal device.

S1304: The target user plane access network device sends the first TA information and the first radio bearer configuration information to the control plane access network device. Correspondingly, the terminal device receives the first TA information and the first radio bearer configuration information.

S1305: The control plane access network device sends the first TA information and the first radio bearer configuration information to the terminal device. Correspondingly, the terminal device receives the first TA information and the first radio bearer configuration information.

S1306: The terminal device may perform data transmission with the target user plane access network device based on the received first TA information and the received first radio bearer configuration information.

The data transmission method in embodiments of this application can establish a radio bearer for a data plane based on a network architecture in which a control plane and a user plane are separated to implement data transmission. Common control information is provided by using one control plane access network device, so that common control overheads can be effectively reduced, and system performance can be improved.

In a first optional embodiment, the foregoing S1301 includes: The terminal device sends a random access preamble to the control plane access network device, where the random access preamble indicates the target user plane access network device. Correspondingly, the control plane access network device receives the random access preamble. That the control plane access network device sends the first TA information to the terminal device in the foregoing S1305 includes: The control plane access network device sends a random access response RAR message to the terminal device, where the RAR message carries the first TA information. Correspondingly, the terminal device receives the RAR message. The method further includes: The terminal device sends a radio resource control RRC connection setup request message to the control plane access network device. Correspondingly, the control plane access network device receives the RRC connection setup request message. That the control plane access network device sends the first radio bearer configuration information to the terminal device in the foregoing S1305 includes: The control plane access network device sends an RRC connection setup message or an RRC connection reconfiguration message to the terminal device, where the RRC connection setup message or the RRC connection reconfiguration message carries the first radio bearer configuration information. Correspondingly, the terminal device receives the RRC connection setup message or the RRC connection reconfiguration message.

In an optional embodiment, a random access resource of the control plane access network device corresponds to the at least one user plane access network device. The random access preamble is sent on a random access resource corresponding to the target user plane access network device.

Because the random access preamble is sent on the random access resource corresponding to the target user plane access network device, the control plane access network device may directly determine, based on the random access resource, the target user plane access network device selected by the terminal device. Additional indication information is not required. In this way, signaling overheads can be effectively reduced, and user experience can be improved.

In an optional embodiment, the foregoing S1302 includes: The control plane access network device sends first indication information to the target user plane access network device, where the first indication information indicates a random access resource selected by the terminal device. Correspondingly, the target user plane access network device performs the foregoing S1303 and S1304 based on a random access resource selected by the terminal device.

In a second optional embodiment, the method further includes: The terminal device sends a random access preamble to the control plane access network device. Correspondingly, the control plane access network device receives the random access preamble, and sends the RAR message to the terminal device. The terminal device receives the RAR message. The foregoing S1301 includes: The terminal device sends an RRC connection setup request message to the control plane access network device, where the RRC connection setup request message includes the selection information. Correspondingly, the control plane access network device receives the RRC connection setup request message. The foregoing S1305 includes the following steps.

(1) The control plane access network device sends an RRC connection setup message or an RRC connection reconfiguration message to the terminal device, where the RRC connection setup message or the RRC connection reconfiguration message includes the first TA information and/or the first radio bearer configuration information. Correspondingly, the terminal device receives the RRC connection setup message or the RRC connection reconfiguration message. Alternatively:

(2) The control plane access network device sends an RRC connection setup message and an RRC connection reconfiguration message to the terminal device, where the RRC connection setup message includes the first TA information, and the RRC connection reconfiguration message includes the first radio bearer configuration information. Correspondingly, the terminal device receives the RRC connection setup message or the RRC connection reconfiguration message.

That is, in embodiments of this application, the first TA information and the first radio bearer configuration information may be sent in a same message, or may be respectively sent in two different messages. This is not limited in embodiments of this application.

In an optional embodiment, the foregoing S1302 includes: The control plane access network device sends a user plane addition request message to the target user plane access network device based on the RRC connection setup request message. Correspondingly, the target user plane access network device receives the user plane addition request message, and performs the foregoing S1303. The foregoing S1304 includes: The target user plane access network device sends a user plane addition acknowledgment message to the control plane access network device, where the user plane addition acknowledgment message carries the first TA information and the first radio bearer configuration information. Correspondingly, the control plane access network device receives the user plane addition acknowledgment message.

In an optional embodiment, the RAR message further includes second TA information, and the second TA information indicates a TA value of the terminal device on the control plane access network device. The RRC connection setup message further includes second radio bearer configuration information, and the second radio bearer configuration information indicates a signaling radio bearer SRB allocated by the control plane access network device to the terminal device.

It should be understood that the terminal device may obtain the second TA information and the second radio bearer configuration information in the foregoing process, so that the terminal device establishes an RRC connection to the control plane access network device.

The data transmission method in this application is described below with reference to a random access process. In a network architecture in which a control unit and a service unit are decoupled, the random access process may include the following several possible examples. It should be understood that, for ease of description, the UE, the cNB, and the sNB are used as examples for description.

Figure 14:
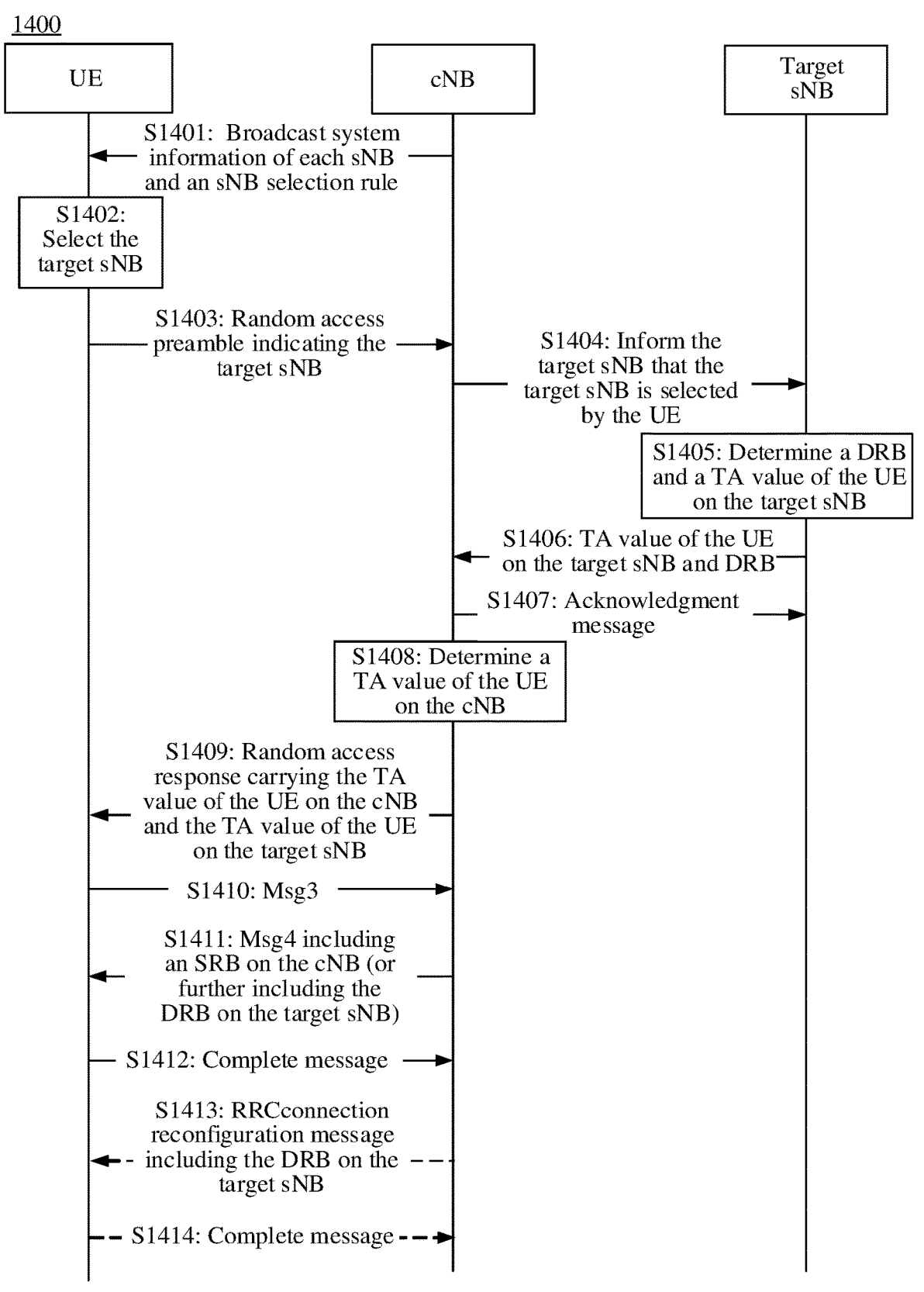
FIG. 14 is a schematic flowchart of another data transmission method according to an embodiment of this application.

FIG. 14 shows a possible implementation of a random access process, including the following steps.

S1401: The cNB broadcasts system information of a plurality of sNBs and an sNB selection rule. Optionally, the system information may include MIBs and SIBs of the plurality of sNBs. Correspondingly, the UE may receive, as required, the system information of at least one sNB in the plurality of sNBs and the sNB selection rule.

For example, the sNB selection rule may be factors such as signal quality and a load status of the user plane access network device that are measured by the terminal device.

S1402: The UE selects one target sNB from the at least one sNB based on the obtained system information of the at least one sNB and the obtained sNB selection rule.

S1403: The UE sends a random access preamble (that is, an Msg 1) to the cNB, where the random access preamble indicates the target sNB. Correspondingly, the cNB receives the random access preamble.

S1404: The cNB notifies the target sNB that the cNB is selected by the UE, and obtains information about a data radio bearer (data radio bearer, DRB) and a timing advance (timing advance, TA).

S1405: The target sNB determines a DRB allocated to the UE and a TA value of the UE on the target sNB. The DRB is a data radio bearer allocated by the target sNB to the UE, and is used to transmit data.

S1406: The target sNB sends the DRB (that is, the first radio bearer configuration information) and the TA value of the UE on the target sNB (that is, the first TA information) to the cNB. Correspondingly, the cNB receives the DRB and the TA value of the UE on the target sNB.

S1407: The cNB returns an acknowledgment message to the target sNB.

Correspondingly, the target sNB receives the acknowledgment message. The acknowledgment message indicates that the cNB correctly receives the DRB and the foregoing TA value.

S1408: The cNB determines a TA value of the UE on the cNB (that is, the foregoing second TA information).

S1409: The cNB sends a random access response (that is, an Msg 2) to the UE, where the random access response carries the TA value of the UE on the cNB and the TA value of the UE on the target sNB. Correspondingly, the UE receives the random access response.

S1410: The UE sends an Msg 3 to the cNB, where the Msg 3 may be an RRC connection setup request message or an RRC connection reconfiguration request message. Correspondingly, the cNB receives the Msg 3.

S1411: The cNB sends an Msg 4 to the UE, where the Msg 4 may be an RRC connection setup message or an RRC connection reconfiguration message. Correspondingly, the UE receives the Msg 4.

In a possible implementation, if the Msg 4 is an RRC connection setup message, the Msg 4 carries an SRB of the UE on the cNB. The SRB is a signaling radio bearer allocated by the cNB to the UE, and is used to establish a control plane connection. S1412: The UE establishes a control plane connection to the cNB based on the TA value and the SRB of the UE on the cNB, and sends a complete message to the cNB, indicating that RRC connection setup is completed. The procedure in this embodiment further includes the following steps.

S1413: The cNB sends an RRC connection reconfiguration message to the UE, where the RRC connection reconfiguration message includes the DRB on the target sNB.

Correspondingly, the UE receives the RRC connection reconfiguration message.

S1414: The UE establishes a user plane connection to the target sNB based on the TA value on the target sNB and the DRB on the target sNB, to transmit data, and sends a complete message to the cNB, indicating that RRC connection reconfiguration is completed.

In another possible implementation, if the Msg 4 is an RRC connection reconfiguration message, the Msg 4 carries the SRB of the UE on the cNB and the DRB of the UE on the target sNB. S1412: The UE establishes a control plane connection to the cNB based on the TA value and the SRB of the UE on the cNB, and establishes a user plane connection to the target sNB based on the TA value and the DRB of the UE on the target sNB, to transmit data.

In embodiments of this application, the UE may be enabled to establish a control plane on the cNB and establish a data plane on the sNB by notifying the cNB of sNB decision information based on the Msg 1 and obtaining TA information by using the Msg 2. The new wireless network architecture can reduce common control overheads and improve user experience.

Figure 15:
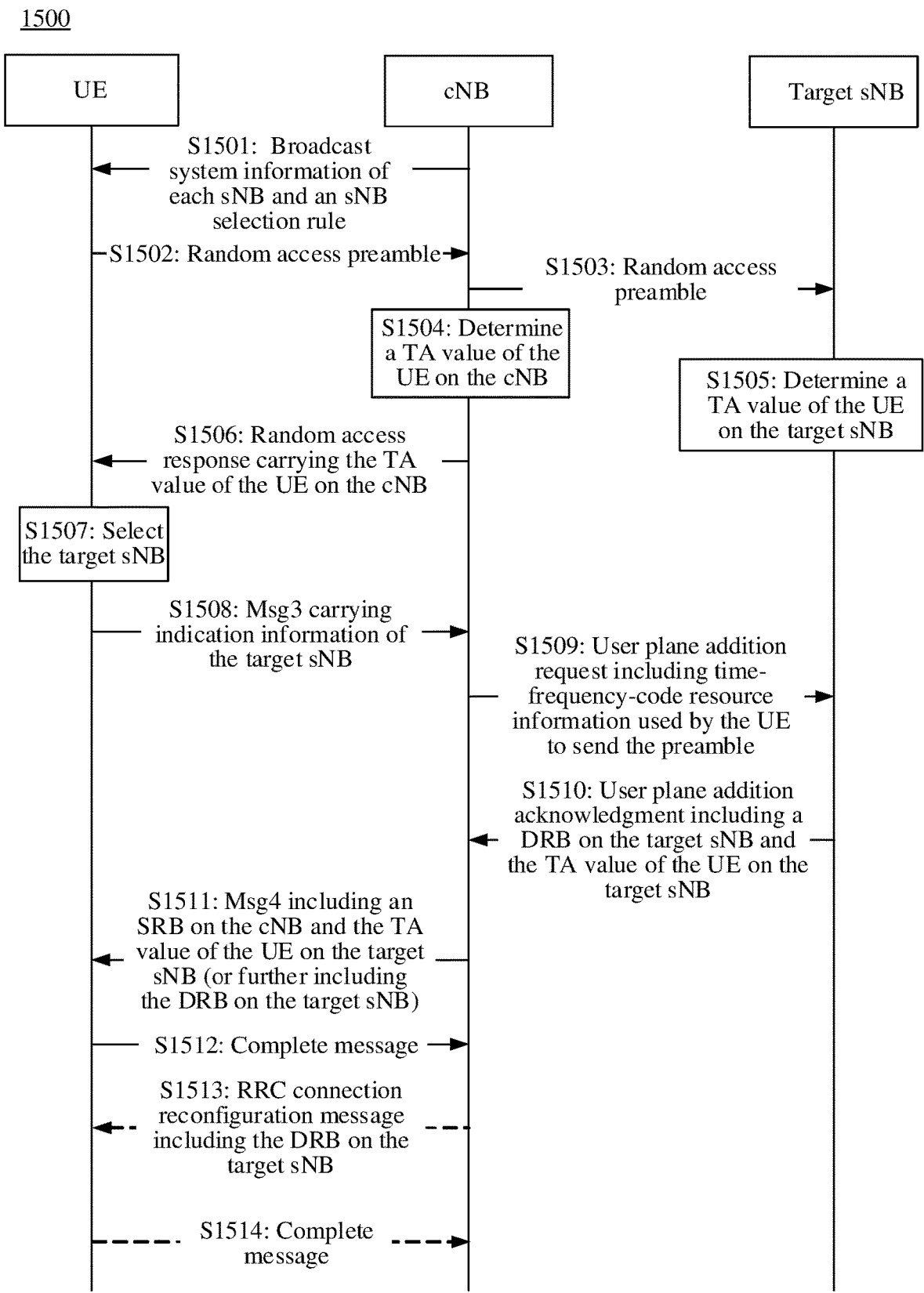
FIG. 15 is a schematic flowchart of another data transmission method according to an embodiment of this application.

FIG. 15 shows another possible implementation of a random access process, including the following steps.

S1501: The cNB broadcasts system information of a plurality of sNBs and an sNB selection rule. Optionally, the system information may include MIBs and SIBs of a plurality of sNBs. Correspondingly, the UE may receive, as required, the system information of at least one sNB in the plurality of sNBs and the sNB selection rule.

For example, the sNB selection rule may be factors such as signal quality and a load status of the user plane access network device that are measured by the terminal device.

S1502: The UE sends a random access preamble (that is, an Msg 1) to the cNB. Correspondingly, the cNB receives the random access preamble.

S1503: The cNB sends the random access preamble to the at least one sNB. Correspondingly, the at least one sNB receives the random access preamble. It should be understood that the figure only shows that the cNB sends the random access preamble to a target sNB. However, in this case, the UE has not determined the target sNB. Therefore, the cNB sends the random access preamble to the at least one sNB including the target sNB.

S1504: The cNB determines a TA value (that is, the foregoing second TA information) of the UE on the cNB.

S1505: The at least one sNB determines a TA value (that is, the foregoing first TA information) of the UE on the at least one sNB.

S1506: The cNB sends a random access response (that is, an Msg 2) to the UE, where the random access response carries the TA value of the UE on the cNB. Correspondingly, the UE receives the random access response.

S1507: The UE selects one target sNB from the at least one sNB based on the obtained system information of the at least one sNB and the obtained sNB selection rule.

S1508: The UE sends an Msg 3 to the cNB, where the Msg 3 carries indication information of the target sNB, and the Msg 3 may be an RRC connection setup request message or an RRC connection reconfiguration request message. Correspondingly, the cNB receives the Msg 3.

S1509: The cNB sends a user plane addition request message to the target sNB, where the user plane addition request message may include time-frequency-code resource information used by the UE to send the preamble. Correspondingly, the target sNB receives the user plane addition request message.

S1510: The target sNB allocates a DRB (that is, the first radio bearer configuration information) to the UE, and sends a user plane addition acknowledgment message to the cNB, including a DRB of the UE on the target sNB and a TA value of the UE on the target sNB. Correspondingly, the cNB receives the user plane addition acknowledgment message.

S1511: The cNB sends an Msg 4 to the UE, where the Msg 4 may be an RRC connection setup message or an RRC connection reconfiguration message. Correspondingly, the UE receives the Msg 4.

In a possible implementation, if the Msg 4 is an RRC connection setup message, the Msg 4 carries an SRB on the cNB and the TA value of the UE on the target sNB. S1512:

The UE establishes a control plane connection to the cNB based on the TA value and the SRB of the UE on the cNB, and sends a complete message to the cNB, indicating that RRC connection setup is completed. The procedure in this embodiment further includes the following steps.

S1513: The cNB sends an RRC connection reconfiguration message to the UE, where the RRC connection reconfiguration message includes the DRB on the target sNB. Correspondingly, the UE receives the RRC connection reconfiguration message.

S1514: The UE establishes a user plane connection to the target sNB based on the TA value of the UE on the target sNB and the DRB on the target sNB, to transmit data, and sends a complete message to the cNB, indicating that RRC connection reconfiguration is completed.

In another possible implementation, if the Msg 4 is an RRC connection reconfiguration message, the Msg 4 carries the SRB on the cNB, the TA value of the UE on the target sNB, and the DRB on the target sNB. S1512: The UE establishes a control plane connection to the cNB based on the TA value and the SRB of the UE on the cNB, and establishes a user plane connection to the target sNB based on the TA value and the DRB of the UE on the target sNB, to transmit data.

In embodiments of this application, the UE may be enabled to establish a control plane on the cNB and establish a data plane on the sNB by notifying the cNB of sNB decision information based on the Msg 3 and obtaining TA information by using the Msg 4. The new wireless network architecture can reduce common control overheads and improve user experience.

Figure 16:
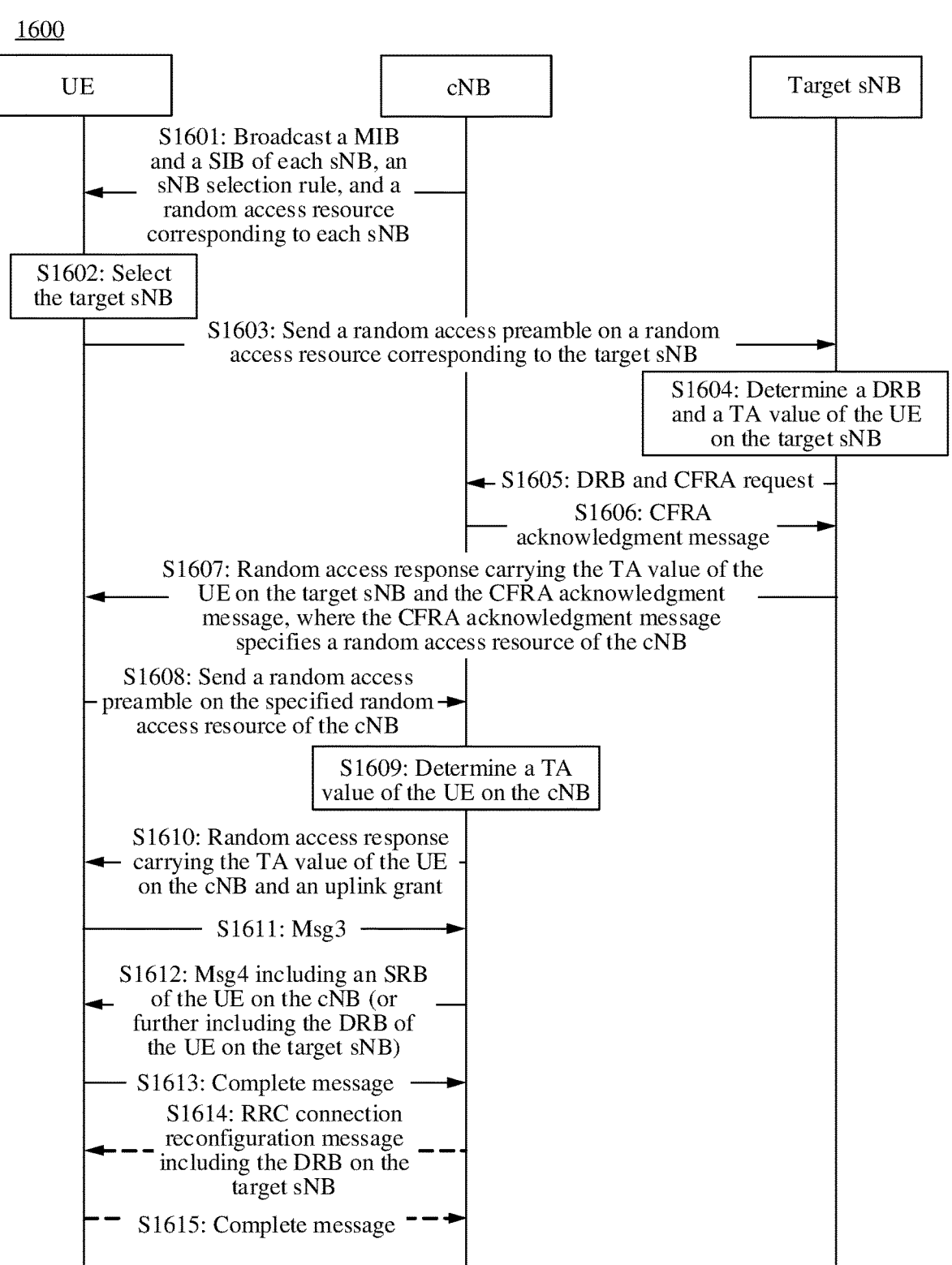
FIG. 16 is a schematic flowchart of another data transmission method according to an embodiment of this application.

FIG. 16 shows a possible implementation of a random access process, including the following steps.

S1601: The cNB broadcasts system information of a plurality of sNBs, an sNB selection rule, and random access resources corresponding to the plurality of sNBs. Optionally, the system information includes MIBs and SIBs of the plurality of sNBs. Correspondingly, the UE may receive, as required, the system information of at least one sNB in the plurality of sNBs and the sNB selection rule.

For example, the sNB selection rule may be factors such as signal quality and a load status of the user plane access network device that are measured by the terminal device.

S1602: The UE selects one target sNB from the at least one sNB based on the obtained system information of the at least one sNB and the obtained sNB selection rule.

S1603: The UE sends a random access preamble (that is, an Msg 1) to the target sNB on a random access resource corresponding to the target sNB. Correspondingly, the target sNB receives the random access preamble.

Optionally, considering that coverage of a low-frequency cNB is different from that of a high-frequency sNB, one high-frequency sNB may provide data plane services to a plurality of low-frequency cNBs. As shown in FIG. 17, the sNB may provide data plane services to a cNB 1 and a cNB 2. In this case, the sNB may not know to which cNB the UE wants to establish a connection. Therefore, a correspondence between a random access resource of an sNB and a cNB may be established in advance, and an sNB may determine, based on a random access resource (time, frequency, and code) used by the UE, a cNB to which the UE wants to establish an RRC connection. For example, if the UE wants to establish an RRC connection to the cNB 1, the UE may select a random access resource 1 corresponding to the cNB 1 to send the random access preamble. If the UE wants to establish an RRC connection to the cNB 2, the UE may select a random access resource 2 corresponding to the cNB 2 to send the random access preamble.

Therefore, the random access resource 1 and the random access resource 2 need to be different from each other, so that the random access resource 1 and the random access resource 2 may be different time domain resources, for example, different subframes, slots, and symbols, that is, time division multiplexing (time division multiplexing, TDM) is used. Alternatively, the random access resource 1 and the random access resource 2 may be different frequency domain resources, for example, different physical resource blocks (physical resource block, PRB), that is, frequency division multiplexing (frequency division multiplexing, FDM) is used. Alternatively, the random access resource 1 and the random access resource 2 may be different preamble resources, that is, code division multiplexing (code division multiplexing, CDM) is used.

S1604: The target sNB determines a DRB (that is, the foregoing first radio bearer configuration information) allocated to the UE and a TA value (that is, the foregoing first TA information) of the UE on the target sNB.

S1605: The target sNB sends the DRB and a contention-free random access (contention-free random access, CFRA) request message to the cNB, where the CFRA request message may include time-frequency code information of the random access preamble. Correspondingly, the UE receives the DRB and the CFRA request message.

S1606: The cNB allocates a random access resource to the UE based on the CFRA request message, executes an uplink grant, and sends a CFRA acknowledgment message to the target sNB, where the CFRA acknowledgment message specifies the random access resource of the cNB. Correspondingly, the target sNB receives the CFRA acknowledgment message.

S1607: The target sNB sends a random access response (that is, an Msg 2) to the UE, where the random access response carries the TA value of the UE on the target sNB and the foregoing CFRA acknowledgment message. Correspondingly, the UE receives the random access response.

S1608: The UE sends a random access preamble (that is, an Msg 1) to the cNB on the random access resource specified in the CFRA acknowledgment message. Correspondingly, the cNB receives the random access preamble.

S1609: The cNB determines a TA value (that is, the foregoing second TA information) of the UE on the cNB.

S1610: The cNB sends a random access response (that is, an Msg 2) to the UE, where the random access response carries the TA value of the UE on the cNB and uplink grant information. Correspondingly, the UE receives the random access response.

S1611: The UE sends an Msg 3 to the cNB, where the Msg 3 may be an RRC connection setup request message or an RRC connection reconfiguration request message. Correspondingly, the cNB receives the Msg 3.

S1612: The cNB sends an Msg 4 to the UE, where the Msg 4 may be an RRC connection setup message or an RRC connection reconfiguration message. Correspondingly, the UE receives the Msg 4.

In a possible implementation, if the Msg 4 is an RRC connection setup message, the Msg 4 carries an SRB of the UE on the cNB. S1613: The UE establishes a control plane connection to the cNB based on the TA value and the SRB of the UE on the cNB, and sends a complete message to the cNB, indicating that RRC connection setup is completed. The process further includes the following steps.

S1614: The cNB sends an RRC connection reconfiguration message to the UE, where the RRC connection reconfiguration message includes the DRB on the target sNB. Correspondingly, the UE receives the RRC connection reconfiguration message.

S1615: The UE establishes a user plane connection to the target sNB based on the TA value on the target sNB and the DRB on the target sNB, to transmit data, and sends a complete message to the cNB, indicating that RRC connection reconfiguration is completed.

In another possible implementation, if the Msg 4 is an RRC connection reconfiguration message, the Msg 4 carries the SRB of the UE on the cNB and the DRB of the UE on the target sNB. S1613: The UE establishes a control plane connection to the cNB based on the TA value and the SRB of the UE on the cNB, and establishes a user plane connection to the target sNB based on the TA value and the DRB of the UE on the target sNB, to transmit data.

In summary, in the random access process, the UE may notify the cNB of the selection information of the target sNB by using the Msg 1 or the Msg 3. The TA value (that is, the first TA information) of the UE on the sNB is obtained from the Msg 2 or the Msg 4.

In the procedure shown in FIG. 16, the first TA information and the second TA information are carried in the Msg 2 message together. In this case, the first TA information and the second TA information may be placed in one MAC RAR, or may be included in different MAC RARs.

In a possible implementation, the first TA information and the second TA information may be placed in one MAC RAR. As shown in FIG. 18, the first TA information and the second TA information may be placed in one MAC RAR. For example, the MAC RAR further includes an uplink grant (UL-Grant) and a cell radio network temporary identifier (cell radio network temporary identifier, C-RNTI) that are allocated by the target user plane access network device (that is, the target sNB) to the terminal device. R is a reserved bit.

In another possible implementation, the first TA information and the second TA information may be included in different MAC RARs. As shown in FIG. 19, the first TA information is carried in a first MAC RAR, and the second TA information is carried in a second MAC RAR. The two MAC RARs correspond to two MAC subPDUs (MAC subPDUs) of the target user plane access network device (that is, the target sNB). T indicates whether a MAC subheader includes a random access preamble identifier (RAPID). The RAPID indicates a random access preamble (random access preamble, RAP) identifier carried in the Msg 1. RAPIDs of two MAC subPDUs are the same, and an indication may be additionally added to the MAC subheader to distinguish whether the MAC RAR carries a TA of the target user plane access network device or a TA of the control plane access network device (that is, the cNB). Alternatively, whether the MAC RAR carries the TA of the target user plane access network device or the TA of the control plane access network device may be distinguished according to a sequence. For example, a MAC RAR that carries the TA of the target user plane access network device is followed by a MAC RAR that carries the TA of the control plane access network device.

It should be understood that sequence numbers of the foregoing processes do not mean execution sequences in the embodiments of this application. The execution sequences of the processes should be determined based on functions and internal logic of the processes, and should not constitute any limitation on implementation processes of the embodiments of this application.

It should be further understood that the embodiments described in the method 1300, the method 1400, the method

1500, and the method 1600 are some embodiments of this application, and all other embodiments obtained by a person of ordinary skill in the art based on embodiments of this application without creative efforts shall fall within the protection scope of this application. In addition, the steps included in the method 1300, the method 1400, the method 1500, and the method 1600 are also examples described in this application for ease of understanding. The protection scope of this application is not limited to performing all steps in the foregoing methods. That is, the embodiments of performing some steps in the foregoing methods also fall within the protection scope of this application.

The data transmission methods provided in embodiments of this application is described above in detail, with reference to FIG. 6 to FIG. 19. The data transmission apparatuses provided in embodiments of this application are described below in detail with reference to FIG. and FIG. 21.

Figure 20:
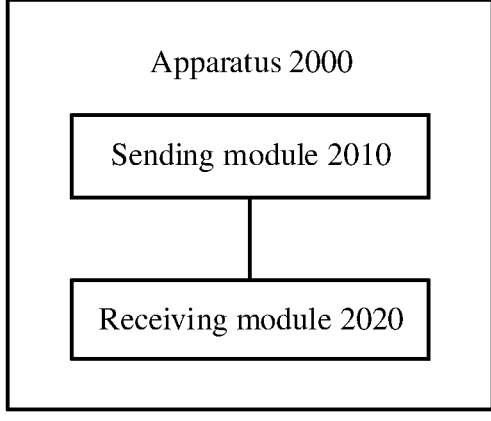
FIG. 20 is a schematic diagram of a structure of a data transmission apparatus according to an embodiment of this application.

FIG. 20 shows a data transmission apparatus 2000 according to an embodiment of this application. The apparatus 2000 includes a sending module 2010 and a receiving module 2020.

In a possible design, the apparatus 2000 may correspond to the terminal device in the foregoing method embodiments, for example, may be a terminal device or a chip configured in the terminal device. The apparatus 2000 is configured to perform steps or procedures corresponding to the terminal device in the foregoing method embodiments.

The sending module 2010 is configured to send selection information to a control plane access network device, where the selection information indicates a target user plane access network device, and the target user plane access network device is determined from at least one user plane access network device based on system information and a user plane access network device selection rule. The receiving module 2020 is configured to receive first timing advance TA information and first radio bearer configuration information that are from the control plane access network device, where the first TA information indicates a TA value of the apparatus 2000 on the target user plane access network device, and the first radio bearer configuration information indicates a data radio bearer DRB allocated by the target user plane access network device to the apparatus, where The sending module 2010 and/or the receiving module 2020 are/is further configured to perform data transmission with the target user plane access network device based on the first TA information and the first radio bearer configuration information.

Optionally, the sending module 2010 is specifically configured to send a random access preamble to the control plane access network device, where the random access preamble indicates the target user plane access network device. The receiving module 2020 is specifically configured to receive a random access response RAR message from the control plane access network device, where the RAR message includes the first TA information. The sending module 2010 is further configured to send a radio resource control RRC connection setup request message to the control plane access network device. The receiving module 2020 is specifically configured to receive an RRC connection setup message or an RRC connection reconfiguration message from the control plane access network device, where the RRC connection setup message or the RRC connection reconfiguration message carries the first radio bearer configuration information.

Optionally, a random access resource of the control plane access network device corresponds to the at least one user plane access network device. The random access preamble is sent on a random access resource corresponding to the target user plane access network device.

Optionally, the sending module 2010 is further configured to send a random access preamble to the control plane access network device. The receiving module 2020 is further configured to receive a RAR message from the control plane access network device. The sending module 2010 is further configured to send an RRC connection setup request message to the control plane access network device, where the RRC connection setup request message includes the selection information. The receiving module 2020 is further configured to: receive an RRC connection setup message or an RRC connection reconfiguration message from the control plane access network device, where the RRC connection setup message or the RRC connection reconfiguration message includes the first TA information and/or the first radio bearer configuration information; or receive an RRC connection setup message and an RRC connection reconfiguration message that are from the control plane access network device, where the RRC connection setup message includes the first TA information, and the RRC connection reconfiguration message carries the first radio bearer configuration information.

Optionally, a random access resource of the control plane access network device corresponds to the at least one user plane access network device. The random access preamble is sent on a random access resource corresponding to the target user plane access network device.

Optionally, the sending module 2010 is further configured to send a random access preamble to the control plane access network device. The receiving module 2020 is further configured to receive a RAR message from the control plane access network device. The sending module 2010 is further configured to send an RRC connection setup request message to the control plane access network device, where the RRC connection setup request message includes the selection information. The receiving module 2020 is further configured to: receive an RRC connection setup message or an RRC connection reconfiguration message from the control plane access network device, where the RRC connection setup message or the RRC connection reconfiguration message includes the first TA information and/or the first radio bearer configuration information; or receive an RRC connection setup message and an RRC connection reconfiguration message that are from the control plane access network device, where the RRC connection setup message includes the first TA information, and the RRC connection reconfiguration message carries the first radio bearer configuration information.

Optionally, the RAR message further includes second TA information, and the second TA information indicates a TA value of the apparatus 2000 on the control plane access network device. The RRC connection setup message further includes second radio bearer configuration information, and the second radio bearer configuration information indicates a signaling radio bearer SRB allocated by the control plane access network device to the apparatus 2000.

In another possible design, the apparatus 2000 may correspond to the control plane access network device in the foregoing method embodiments, for example, may be a control plane access network device, or may be a chip configured in the control plane access network device. The apparatus 2000 is configured to perform steps or procedures corresponding to the control plane access network device in the foregoing method embodiments.

The receiving module 2020 is configured to: receive selection information from a terminal device, where the selection information indicates a target user plane access network device, and the target user plane access network device is determined from at least one user plane access network device based on system information and a user plane access network device selection rule; and obtain first timing advance TA information and first radio bearer configuration information from the target user plane access network device, where the first TA information indicates a TA value of the terminal device on the target user plane access network device, and the first radio bearer configuration information indicates a data radio bearer DRB allocated by the target user plane access network device to the terminal device. The sending module 2010 is configured to send the first TA information and the first radio bearer configuration information to the terminal device.

Optionally, the receiving module 2020 is specifically configured to receive a random access preamble from the terminal device, where the random access preamble indicates the target user plane access network device. The sending module 2010 is specifically configured to send a random access response RAR message to the terminal device, where the RAR message carries the first TA information. The receiving module 2020 is further configured to receive a radio resource control RRC connection setup request message from the terminal device. The sending module 2010 is specifically configured to send an RRC connection setup message or an RRC connection reconfiguration message to the terminal device, where the RRC connection setup message or the RRC connection reconfiguration message carries the first radio bearer configuration information.

Optionally, a random access resource of the apparatus corresponds to the at least one user plane access network device. The random access preamble is sent on a random access resource corresponding to the target user plane access network device.

Optionally, the sending module 2010 is further configured to send first indication information to the target user plane access network device, where the first indication information indicates a random access resource selected by the terminal device. The receiving module 2020 is further configured to receive the first TA information and the first radio bearer configuration information from the target user plane access network device.

Optionally, the receiving module 2020 is further configured to receive a random access preamble from the terminal device. The sending module 2010 is further configured to send a RAR message to the terminal device. The receiving module 2020 is further configured to receive an RRC connection setup request message from the terminal device, where the RRC connection setup request message includes the selection information. The sending module 2010 is further configured to: send an RRC connection setup message or an RRC connection reconfiguration message, where the RRC connection setup message or the RRC connection reconfiguration message includes the first TA information and/or the first radio bearer configuration information; or send an RRC connection setup message and an RRC connection reconfiguration message to the terminal device, where the RRC connection setup message includes the first TA information, and the RRC connection reconfiguration message includes the first radio bearer configuration information.

Optionally, the obtaining module is further configured to: send a user plane addition request message to the target user plane access network device based on the RRC connection setup request message; and receive a user plane addition acknowledgment message from the target user plane access network device, where the user plane addition acknowledgment message carries the first TA information and the first radio bearer configuration information.

Optionally, the RAR message further includes second TA information, and the second TA information indicates a TA value of the terminal device on the apparatus. The RRC connection setup message further includes second radio bearer configuration information, and the second radio bearer configuration information indicates a signaling radio bearer SRB allocated by the apparatus to the terminal device.

It should be understood that the apparatus 2000 is embodied in a form of a functional unit. The term "unit" may refer to an application-specific integrated circuit (application-specific integrated circuit, ASIC), an electronic circuit, a processor (for example, a shared processor, a dedicated processor, or a group processor) configured to execute one or more software or firmware programs, a memory, a merged logic circuit, and/or another appropriate component that supports the described function. In an optional example, a person skilled in the art may understand that the apparatus 1200 may be specifically the terminal device in the foregoing embodiments, and may be configured to perform procedures and/or steps corresponding to the terminal device in the foregoing method embodiments, or the apparatus 2000 may be specifically the control plane access network device in the foregoing embodiments, and may be configured to perform procedures and/or steps corresponding to the control plane access network device in the foregoing method embodiments. To avoid repetition, details are not described herein again.

The apparatus 2000 in the foregoing solutions has a function of implementing corresponding steps performed by the terminal device in the foregoing methods, or the apparatus 2000 in the foregoing solutions has a function of implementing corresponding steps performed by the control plane access network device in the foregoing methods. The function may be implemented by hardware, or may be implemented by executing corresponding software by hardware. The hardware or the software includes one or more modules corresponding to the function. For example, the receiving unit and/or the sending unit may be replaced with a transceiver (for example, the sending unit may be replaced by a transmitter, and the receiving unit may be replaced by a receiver). Another unit such as a processing unit may be replaced with a processor to separately perform a sending and receiving operation and a related processing operation in each method embodiment.

In addition, the receiving unit and/or the sending unit may alternatively be a transceiver circuit (for example, may include a receiving circuit and a sending circuit), and the processing unit may be a processing circuit. In embodiments of this application, the apparatus in FIG. 20 may be the terminal device or the control plane access network device in the foregoing embodiments, or may be a chip or a chip system, for example, a system on chip (system on chip, SoC). The receiving unit and/or the sending unit may be an input/output circuit or a communication interface. The processing unit is a processor a microprocessor or an integrated circuit integrated on the chip. This is not limited herein.

Figure 21:
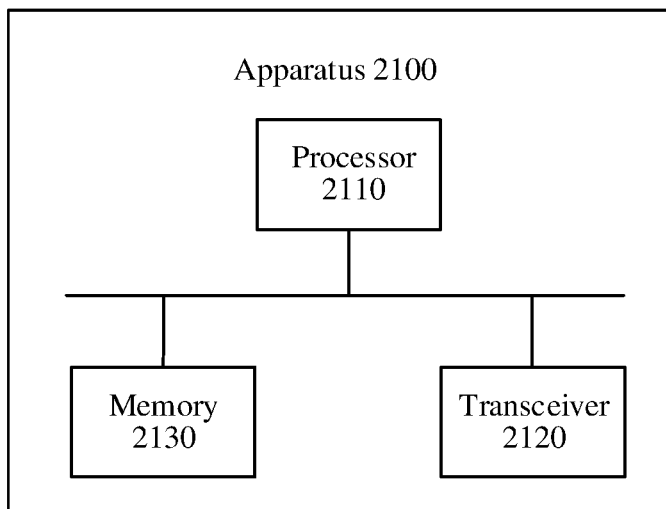
FIG. 21 is a schematic diagram of a structure of another data transmission apparatus according to an embodiment of this application.

FIG. 21 shows another data transmission apparatus 2100 according to an embodiment of this application. The apparatus 2100 includes a processor 2110, a transceiver 2120, and a memory 2130. The processor 2110, the transceiver 2120, and the memory 2130 communicate with each other through an internal connection path. The memory 2130 is configured to store instructions. The processor 2110 is configured to execute the instructions stored in the memory 2130, to control the transceiver 2120 to send a signal and/or receive a signal.

It should be understood that the apparatus 2100 may be specifically the terminal device or the control plane access network device in the foregoing embodiments, or functions of the terminal device or the control plane access network device in the foregoing embodiments may be integrated into the apparatus 2100. The apparatus 2100 may be configured to perform steps and/or procedures corresponding to the terminal device or the control plane access network device in the foregoing embodiments. Optionally, the memory 2130 may include a read-only memory and a random access memory, and provide instructions and data to the processor. A part of the memory may further include a non-volatile random access memory. For example, the memory may further store information about a device type. The processor 2110 may be configured to execute the instructions stored in the memory. When the processor executes the instructions, the processor may perform the steps and/or procedures corresponding to the terminal device or the control plane access network device in the foregoing method embodiments.

It should be understood that, in embodiments of this application, the processor 2110 may be a central processing unit (central processing unit, CPU). Alternatively, the processor may be another general-purpose processor, a digital signal processor (DSP), an application-specific integrated circuit (ASIC), a field programmable gate array (FPGA) or another programmable logic device, a discrete gate or a transistor logic device, a discrete hardware component, or the like. The general-purpose processor may be a microprocessor, or the processor may be any conventional processor or the like.

In an implementation process, the steps of the foregoing methods may be completed by using an integrated logic circuit of hardware in the processor 2110, or by using instructions in a form of software. The steps of the method disclosed with reference to embodiments of this application may be directly performed by a hardware processor 2110, or may be performed by using a combination of hardware in the processor 2110 and a software module. The software module may be located in a mature storage medium in the art, such as a random access memory, a flash memory, a read-only memory, a programmable read-only memory, an electrically erasable programmable memory, or a register. The storage medium is located in the memory, and the processor 2110 executes the instructions in the memory, and completes the steps of the foregoing methods in combination with hardware of the processor 2110. To avoid repetition, details are not described herein again.

An embodiment of this application further provides a communication system. The communication system may include the terminal device and/or the control plane access network device shown in FIG. 20.

According to the method provided in embodiments of this application, this application further provides a computer-readable storage medium. The computer-readable storage medium is configured to store a computer program. The computer program is used to implement the steps or procedures performed by the terminal device or the control plane access network device in the embodiments shown in FIG. 13 to FIG. 16.

According to the method provided in embodiments of this application, this application further provides a computer program product. The computer program product includes a computer program (which may also be referred to as code or instructions). When the computer program is run on a computer, the computer may perform the steps or procedures performed by the terminal device or the control plane access network device in the embodiments shown in FIG. 13 to FIG. 16.

A person of ordinary skill in the art may be aware that, in combination with the examples described in embodiments disclosed in this specification, units and algorithm steps may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of this application.

It may be clearly understood by a person skilled in the art that, for the purpose of convenient and brief description, for a detailed working process of the foregoing system, apparatus, and unit, refer to a corresponding process in the foregoing method embodiments. Details are not described herein again.

In the several embodiments provided in this application, it should be understood that the disclosed system, apparatus, and method may be implemented in other manners. For example, the described apparatus embodiment is merely an example. For example, division into the units is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of embodiments.

In addition, functional units in embodiments of this application may be integrated into one processing unit, each of the units may exist alone physically, or two or more units are integrated into one unit.

When the functions are implemented in the form of a software functional unit and sold or used as an independent product, the functions may be stored in a computer-readable storage medium. Based on such an understanding, the technical solutions of this application essentially, or the part contributing to the conventional technology, or some of the technical solutions may be implemented in a form of a software product. The software product is stored in a storage medium, and includes several instructions for instructing a computer device (which may be a personal computer, a server, or a network device) to perform all or some of the steps of the methods described in embodiments of this application. The foregoing storage medium includes any medium that can store program code, such as a USB flash drive, a removable hard disk, a read-only memory (read-only memory, ROM), a random access memory (random access memory, RAM), a magnetic disk, or an optical disc.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A data transmission method, comprising:

sending, by a terminal device, selection information to a control plane access network device, wherein the selection information indicates a target user plane access network device, and the target user plane access network device is determined from at least one user plane access network device based on system information and a user plane access network device selection rule;

receiving, by the terminal device, first timing advance (TA) information and first radio bearer configuration information that are from the control plane access network device, wherein the first TA information indicates a TA value of the terminal device on the target user plane access network device, and the first radio bearer configuration information indicates a data radio bearer (DRB) allocated by the target user plane access network device to the terminal device; and performing, by the terminal device, data transmission with the target user plane access network device based on the first TA information and the first radio bearer configuration information.

2. The data transmission method according to claim 1, wherein the sending, by the terminal device, selection information to the control plane access network device comprises:

sending, by the terminal device, a random access preamble to the control plane access network device, wherein the random access preamble indicates the target user plane access network device.

3. The data transmission method according to claim 2, wherein the receiving, by the terminal device, first timing advance TA information from the control plane access network device comprises:

receiving, by the terminal device, a random access response (RAR) message from the control plane access network device, wherein the RAR message comprises the first TA information.

4. The data transmission method according to claim 3, further comprising:

sending, by the terminal device, a radio resource control (RRC) connection setup request message to the control plane access network device.

5. The data transmission method according to claim 4, wherein the receiving, by the terminal device, the first radio bearer configuration information from the control plane access network device comprises:

receiving, by the terminal device, an RRC connection setup message or an RRC connection reconfiguration message from the control plane access network device, wherein the RRC connection setup message or the RRC connection reconfiguration message carries the first radio bearer configuration information.

6. The data transmission method according to claim 2, wherein a random access resource of the control plane access network device corresponds to the at least one user plane access network device, and wherein the random access preamble is sent on a random access resource corresponding to the target user plane access network device.

7. The data transmission method according to claim 3, further comprising:

sending, by the terminal device, the random access preamble to the control plane access network device; and receiving, by the terminal device, a RAR message from the control plane access network device.

8. The data transmission method according to claim 5, wherein the sending, by the terminal device, selection information to the control plane access network device comprises:

sending, by the terminal device, an RRC connection setup request message to the control plane access network device, wherein the RRC connection setup request message comprises the selection information.

9. The data transmission method according to claim 8, wherein the receiving, by the terminal device, first timing advance TA information and first radio bearer configuration information that are from the control plane access network device comprises:

receiving, by the terminal device, the RRC connection setup message or the RRC connection reconfiguration message from the control plane access network device, wherein the RRC connection setup message or the RRC connection reconfiguration message comprises the first TA information and/or the first radio bearer configuration information; or receiving, by the terminal device, the RRC connection setup message and the RRC connection reconfiguration message that are from the control plane access network device, wherein the RRC connection setup message comprises the first TA information, and the RRC connection reconfiguration message carries the first radio bearer configuration information.

10. The data transmission method according to claim 4, wherein the RAR message further comprises second TA information, and the second TA information indicates a TA value of the terminal device on the control plane access network device, and wherein the RRC connection setup message further comprises second radio bearer configuration information, and the second radio bearer configuration information indicates a signaling radio bearer SRB allocated by the control plane access network device to the terminal device.

11. A data transmission apparatus, comprising:

a memory;

a processor coupled to the memory and configured to send selection information to a control plane access network device, wherein the selection information indicates a target user plane access network device, and the target user plane access network device is determined from at least one user plane access network device based on system information and a user plane access network device selection rule;

receive first timing advance (TA) information and first radio bearer configuration information that are from the control plane access network device, wherein the first TA information indicates a TA value of the apparatus on the target user plane access network device, and the first radio bearer configuration information indicates a data radio bearer (DRB) allocated by the target user plane access network device to the apparatus; and perform data transmission with the target user plane access network device based on the first TA information and the first radio bearer configuration information.

12. The apparatus according to claim 11, wherein the processor is further configured to send a random access preamble to the control plane access network device, wherein the random access preamble indicates the target user plane access network device;

receive a random access response (RAR) message from the control plane access network device, wherein the RAR message comprises the first TA information;

send a radio resource control (RRC) connection setup request message to the control plane access network device; and receive an RRC connection setup message or an RRC connection reconfiguration message from the control plane access network device, wherein the RRC connection setup message or the RRC connection reconfiguration message carries the first radio bearer configuration information.

13. The apparatus according to claim 12, wherein a random access resource of the control plane access network device corresponds to the at least one user plane access network device; and the random access preamble is sent on a random access resource corresponding to the target user plane access network device.

14. The apparatus according to claim 11, wherein the processor is further configured to send a random access preamble to the control plane access network device;

receive a RAR message from the control plane access network device;

send an RRC connection setup request message to the control plane access network device, wherein the RRC connection setup request message comprises the selection information; and receive an RRC connection setup message or an RRC connection reconfiguration message from the control plane access network device, wherein the RRC connection setup message or the RRC connection reconfiguration message comprises the first TA information and/or the first radio bearer configuration information; or receive an RRC connection setup message and an RRC connection reconfiguration message that are from the control plane access network device, wherein the RRC connection setup message comprises the first TA information, and the RRC connection reconfiguration message carries the first radio bearer configuration information.

15. The apparatus according to claim 12, wherein the RAR message further comprises second TA information, and the second TA information indicates a TA value of the apparatus on the control plane access network device, and wherein the RRC connection setup message further comprises second radio bearer configuration information, and the second radio bearer configuration information indicates a signaling radio bearer (SRB) allocated by the control plane access network device to the apparatus.

16. A non-transitory computer-readable storage medium storing computer instructions, that when executed by one or more processors, cause the one or more processors to perform steps of:

sending selection information to a control plane access network device, wherein the selection information indicates a target user plane access network device, and the target user plane access network device is determined from at least one user plane access network device based on system information and a user plane access network device selection rule;

receiving first timing advance (TA) information and first radio bearer configuration information that are from the control plane access network device, wherein the first TA information indicates a TA value of the terminal device on the target user plane access network device, and the first radio bearer configuration information indicates a data radio bearer (DRB) allocated by the target user plane access network device to the terminal device; and performing data transmission with the target user plane access network device based on the first TA information and the first radio bearer configuration information.

\* \* \* \* \*